United States Patent [19]

Schwander

[11] Patent Number: 4,467,088

[45] Date of Patent: Aug. 21, 1984

[54] S-TRIAZINES

[75] Inventor: Hansrudolf Schwander, Riehen, Switzerland

[73] Assignee: Ciba-Geigy Corporation, Ardsley, N.Y.

[21] Appl. No.: 425,592

[22] Filed: Sep. 28, 1982

Related U.S. Application Data

[62] Division of Ser. No. 186,830, Sep. 12, 1980, abandoned.

[30] Foreign Application Priority Data

Sep. 24, 1979 [CH] Switzerland .......................... 8604/79

[51] Int. Cl.³ .................. C07D 251/46; C07D 251/52; C07D 251/70
[52] U.S. Cl. .................................... 544/197; 544/211; 544/208
[58] Field of Search ............... 544/197, 206, 209, 199, 544/211, 213, 208, 210

[56] References Cited

FOREIGN PATENT DOCUMENTS 26414 4/1981 European Pat. Off. .

Primary Examiner—John M. Ford
Attorney, Agent, or Firm—Edward McC. Roberts

[57] ABSTRACT s-Triazine compounds of the formula:

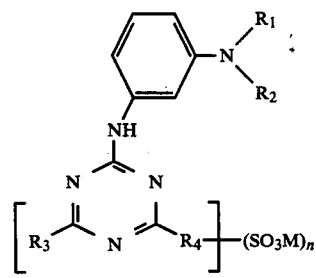

in which $R_1$ and $R_2$ independently of one another are $C_{1-4}$ alkyl, $R_3$ and $R_4$ independently of one another are one of the following radicals; $C_{1-10}$ alkoxy which is unsubstituted or substituted by alkoxy; N-$C_{1-10}$ alkylamino which is unsubstituted or substituted by phenyl; phenylamino which is unsubstituted or substituted by halogen, $C_{1-4}$ alkyl or $C_{1-4}$ alkoxy; naphthylamino which is unsubstituted or substituted by halogen, $C_{1-4}$ alkyl or $C_{1-4}$ alkoxy; halogen; N-phenyl-N-alkylamino; dialkylamino; alkylmercapto; cyclohexyloxy; N-alkyl-N-cyclohexylamino and cyclohexylamino; M is hydrogen or one equivalent of a cation and n is 1 or 2. These compounds may be used in the preparation of dyes.

1 Claim, No Drawings

S-TRIAZINES

This is a division of application Ser. No. 186,830, filed on Sept. 12, 1980, now abandoned.

The invention relates to novel monoazo compounds, processes for their preparation and their use as dyes for dyeing and printing textile materials, in particular wool and polyamide.

The novel monoazo compounds have the formula I

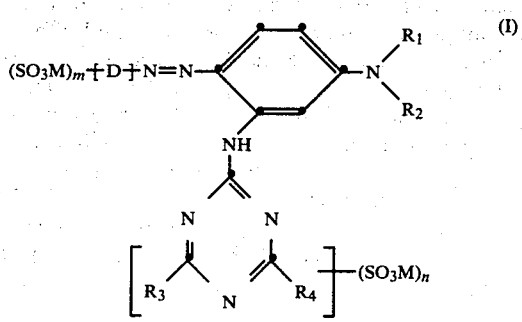

in which D is the radical of an aromatic or heterocyclic diazo component, $R_1$ and $R_2$ independently of one another are an alkyl radical having 1 to 4 carbon atoms, $R_3$ and $R_4$ independently of one another are one of the following radicals: alkoxy having 1 to 10 carbon atoms, substituted or unsubstituted monoalkylamino, in which the alkyl radical has 1 to 10 carbon atoms, monoarylamino, halogen, N-aryl-N-alkyl-amino, dialkylamino ($C_1$–$C_4$), alkylmercapto, cyclohexyloxy, N-alkyl-N-cyclohexylamino and cyclohexylamino, M is hydrogen or one equivalent of a cation, m is the number 0 or 1 and n is the number 0, 1 or 2, with the proviso that the sum of m+n is in the number range of 1 to 2.

An aromatic or heterocyclic diazo component D is, for example, a radical of the thiazole, thiophen, imidazole, pyridine, indazole, pyrazole, triazole, benztriazole, thiadiazole, isothiazole or benzisothiazole series or, in particular, a radical of the benzthiazole or, especially, the benzene series, and these radicals, in addition to being substituted by the $(SO_3M)_m$-group, can also contain one or more further identical or different substituents, for example halogen, such as fluorine, chlorine or bromine; the $CF_3$ group; a $SO_2$-alkyl group, such as the methylsulfonyl, ethylsulfonyl, n- or iso-propylsulfonyl or n-, sec.- or tert.-butyl-sulfonyl group; a $SO_2$-aryl group, such as the phenylsulfonyl group or naphthylsulfonyl group, which groups can also be further substituted in the phenyl or naphthyl radical, for example by alkyl, in particular methyl; the $SO_2NH_2$ group; a $SO_2N$-alkyl-N-cyclohexyl group, in which the alkyl radical has 1 to 4 carbon atoms, for example the $SO_2N$-methyl-N-cyclohexyl group or the $SO_2N$-propyl-N-cyclohexyl group, or a $SO_2N(alkyl)_2$ group, in which the alkyl radicals have 1 to 4 carbon atoms and are unbranched or branched and can be substituted, such as, for example, the diethylaminosulfonyl group; the substituents can also be a $SO_2NH.R$ group, in which R is an alkyl radical having 1 to 8 carbon atoms which is unsubstituted or substituted, for example by phenyl, such a group being, for example, the monoethylaminosulfonyl group, n- and iso-monobutylaminosulfonyl group, mono-octylaminosulfonyl group or benzylaminosulfonyl group; the radical R can also be an aryl group, such as the phenyl or naphthyl group, or the cyclohexyl group or the group alkyl ($C_1$–$C_4$)—O—$SO_3M$.

As an alkyl radical having 1 to 4 carbon atoms, $R_1$ and $R_2$ are, for example, a branched or preferably unbranched alkyl radical, such as the methyl, ethyl, n- or iso-propyl or n-, sec.- or tert.-butyl radical. In preferred monoazo compounds, $R_1$ and $R_2$ are identical alkyl radicals and in particular are each an ethyl radical.

As an alkoxy group having 1 to 10 carbon atoms, $R_3$ and $R_4$ are an unbranched or branched alkoxy group, for example the methoxy, ethoxy, propoxy, butoxy or octyloxy group, and the alkoxy groups can also be substituted by a further alkoxy group; in a monoalkylamino group $R_3$ or $R_4$ the alkyl radical can have 1 to 10 carbon atoms and can be further substituted, for example by phenyl; such groups are, for example, the methylamino, ethylamino, propylamino, butylamino, octylamino and decylamino group or the benzylamino or phenethylamino group; a monoarylamino group $R_3$ or $R_4$ is, for example, the phenylamino or naphthylamino group, in which the phenyl or naphthyl radical, as well as being substituted by the $(SO_3M)_n$-group, can also be substituted by, for example, halogen or an alkyl group ($C_1$–$C_4$), such as the methyl or ethyl group, or by an alkoxy group ($C_1$–$C_4$), such as the methoxy group; halogen $R_3$ or $R_4$ is fluorine or bromine or preferably chlorine, and a N-alkyl-N-aryl group $R_3$ or $R_4$ is, for example, the N-methyl-N-phenyl group; in a N,N-dialkylamino group $R_3$ or $R_4$ the two alkyl radicals can be identical or different; for example, such groups are the dimethylamino, diethylamino or dibutylamino group or the N-methyl-N-propyl-amino group; an alkylmercapto group $R_3$ or $R_4$ is, for example, the methylthio, ethylthio or propylthio group; a N-alkyl-N-cyclohexyl-amino group $R_3$ or $R_4$ is, for example, the N-methyl-N-cyclohexyl-amino, N-propyl-N-cyclohexylamino or N-butyl-N-cyclohexyl-amino group.

M is hydrogen or any desired cation customary with anionic compounds, in particular dyes, for example M is an alkali metal, ammonium, mono-, di- or tri-($C_2$–$C_3$-alkanol)-ammonium or mono-, di-, tri- or tetra-($C_1$–$C_4$-alkyl)-ammonium, but preferably an alkali metal (lithium, sodium or potassium).

Preferred monoazo compounds have the formula Ia

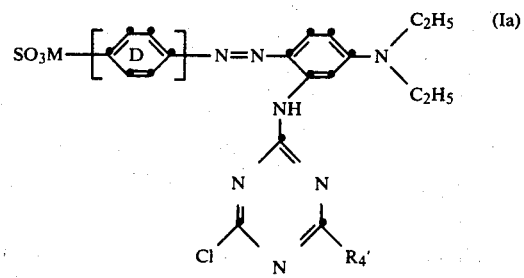

in which the phenyl ring D can be further substituted as already explained and the group $R_4'$ is a NH.alkyl group or a N,N-dialkylamino group or the methylmercapto group and in particular a O-alkyl group, especially the isopropoxy group; or they have the formula Ib

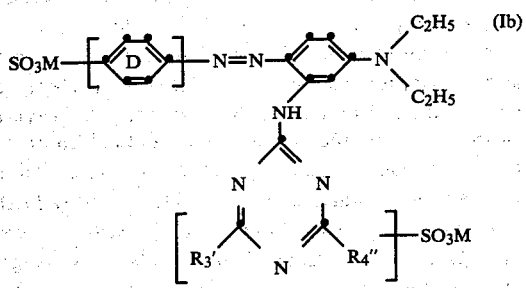

in which the phenyl ring D can be further substituted as already explained and the group $R_3'$ is an arylamino, N-alkyl-N-aryl-amino, N,N-dialkylamino, N-alkyl-N-cyclohexyl-amino, cyclohexylamino or in particular monoalkylamino group and $R_4''$ is phenylamino or naphthylamino.

Finally, monoazo compounds which are also of importance are those of the formula Ic

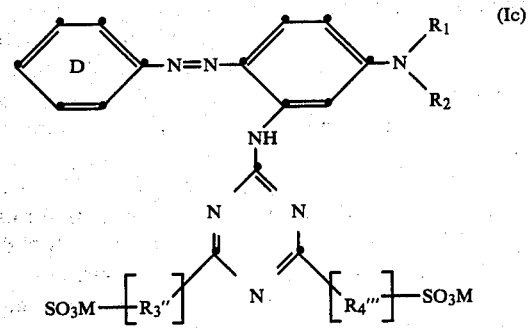

in which the phenyl ring D can be further substituted as explained and the groups $R_3''$ and $R_4'''$ are each an NH-aryl group.

The monoazo compounds according to the invention, of the formula I, can be prepared in a known manner, for example by diazotising an amine of the formula II $$(SO_3M)_m-D-NH_2 \quad (II)$$

and coupling the diazo compound with a coupling component of the formula III

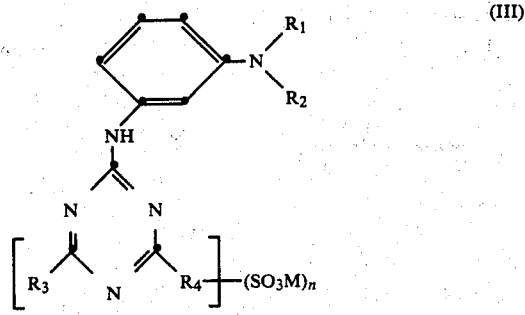

in which formulae the symbols D, M, $R_1$, $R_2$, $R_3$, $R_4$, m and n are as defined. Preferably, the amines of the formula II used are those in which m is the number 1 and the coupling components of the formula III used are those in which n is the number 0 or 1.

The amines of the formula II are known and are prepared by known methods. Examples taken from the large number of possible amines are: 2,5-dichloroaniline-4-sulfonic acid, 2,5-dichloroaniline-4-(N-ethyl-(ω-sulfonic acid))-sulfonic acid amide, 2,5-dichloroaniline-4-(phenyl-4'-sulfonic acid)-sulfonic acid amide, 2,5-dichloroaniline-4-(phenyl-3'-sulfonic acid)-sulfonic acid amide, 2,5-dichloroaniline-4-(phenyl-2'-sulfonic acid)-sulfonic acid amide, 2-chloroaniline-4-(phenyl-4'-sulfonic acid)-sulfonic acid amide, 1-aminobenzene-4-sulfonic acid, 1-aminobenzene-3-sulfonic acid, 1-amino-2-chloro-benzene-5-sulfonic acid, 1-amino-2-chloro-4-methylsulfonyl-benzene, 1-amino-benzene-2-(4'-methylphenyl-sulfone)-5-sulfonic acid, 2-amino-benzthiazole-6-sulfonic acid, 1-amino-2-bromo-4-methylsulfonyl-benzene, 1-amino-2,4,5-trichlorobenzene, 1-amino-2-chloro-4-diethylaminosulfonyl-benzene, 1-amino-2,5-dichlorobenzene, 1-amino-2-chloro-5-methylsulfonyl-benzene, 1-amino-2-chloro-5-ethylsulfonyl-benzene and 1-amino-2-chloro-5-trifluoromethyl-benzene.

The coupling components of the formula III are novel and are a further subject of the invention. These compounds are obtained, for example, by subjecting a diamine of the formula IV

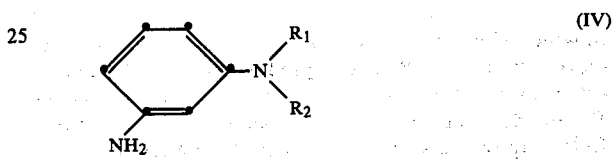

to a condensation reaction with a dichlorotriazine of the formula

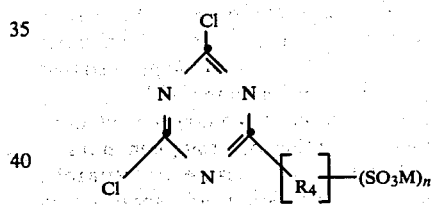

in water at about 5°–10° C., or by subjecting the diamine of the formula IV to a condensation reaction with cyanuric chloride to give a compound of the formula V

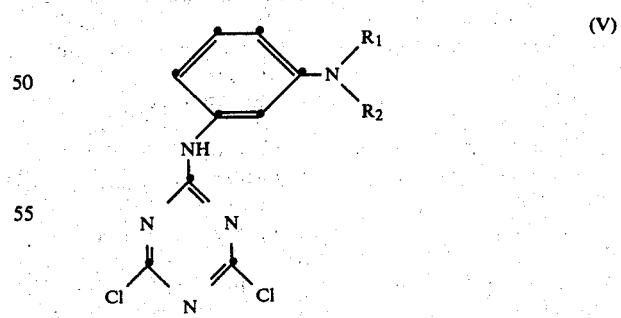

and carrying out a condensation reaction on the two Cl atoms, at the same time or step-wise, with the hydroxyalkyls ($C_1$–$C_{10}$), alkyl ($C_1$–$C_{10}$) amines, arylamines, N-aryl-N-alkyl-amines, N,N-dialkylamines, thioalkyls, hydroxycycloalkyls, N-alkyl-N-cyclohexylamines or cyclohexylamine which introduce the groups $R_3$ and $R_4$, which groups may or may not contain one or two $SO_3M$ groups.

Examples taken from the large number of compounds of the formula III which can be used to prepare the monoazo compounds of the formula I are: 1-diethylamino-3-(2'-isopropoxy-6'-chloro)-triazinylaminobenzene, 1-diethylamino-3-(2'-methoxy-6'-chloro)-triazinylaminobenzene, 1-diethylamino-3-(2'-ethoxy-6'-chloro)-triazinylaminobenzene, 1-diethylamino-3-(2'n-propoxy-6'-chloro)-triazinylaminobenzene, 1-diethylamino-3-(2'-n-butoxy-6'-chloro)-triazinylaminobenzene, 1-diethylamino-3-(2'-isobutoxy-6'-chloro)-triazinylaminobenzene, 1-diethylamino-3-(2'-cyclohexyloxy-6'-chloro)-triazinylaminobenzene, 1-diethylamino-3-(2'-iso-octyloxy-6'-chloro)-triazinylaminobenzene, 1-diethylamino-3-(2'-iso-propylamino-6'-chloro)-triazinylaminobenzene, 1-diethylamino-3-(2'-n-propylamino-6'-chloro)-triazinylaminobenzene, 1-diethylamino-3-(2'-n-butylamino-6'-chloro)-triazinylaminobenzene, 1-diethylamino-3-(2'-isobutylamino-6'-chloro)-triazinylaminobenzene, 1-diethylamino-3-(2'-cyclohexylamino-6'-chloro)-triazinylaminobenzene, 1-diethylamino-3-(2'-benzylamino-6'-chloro)-triazinylaminobenzene, 1-diethylamino-3-(2'-N-methyl-N-propyl-amino-6'-chloro)-triazinylaminobenzene, 1-diethylamino-3-(2'-isopropoxy-6'-n-butylamino)-triazinylaminobenzene, 1-diethylamino-3-(2'-isopropoxy-6'-iso-butylamino)-triazinylaminobenzene, 1-diethylamino-3-(2'-isopropoxy-6'-iso-propylamino)-triazinylaminobenzene, 1-diethylamino-3-(2'-isopropoxy-6'-n-propylamino)-triazinylaminobenzene, 1-diethylamino-3-(2'-isopropoxy-6'-diethylamino)-triazinylaminobenzene, 1-diethylamino-3-(2'-isopropoxy-6'-cyclohexylamino)-triazinylaminobenzene, 1-diethylamino-3-(2'-isopropylamino-6'-isopropylamino)-triazinylaminobenzene, 1-diethylamino-3-(2'-isopropylamino-6'-n-propylamino)-triazinylaminobenzene, 1-diethylamino-3-(2'-isopropylamino-6'-n-butylamino)-triazinylaminobenzene, 1-diethylamino-3-(2'-isopropylamino-6'-isobutylamino)-triazinylaminobenzene, 1-diethylamino-3-(2'-isopropylamino-6'-methylamino)-triazinylaminobenzene, 1-diethylamino-3-(2'-isopropylamino-6'-diethylamino)-triazinylaminobenzene, 1-diethylamino-3-(2'-isopropylamino-6'-cyclohexylamino)-triazinylaminobenzene, 1-diethylamino-3-(2'-isopropylamino-6'-benzylamino)-triazinylaminobenzene, 1-diethylamino-3-(2'-ethylamino-[β-sulfonic acid]-6'-N-methyl-N-cyclohexylamino)-triazinylaminobenzene, 1-diethylamino-3-(2'-ethylamino-[β-sulfonic acid]-6'-methylamino)-triazinylaminobenzene, 1-diethylamino-3-(2'-ethylamino-[β-sulfonic acid]-6'-ethylamino)-triazinylaminobenzene, 1-diethylamino-3-(2'-ethylamino-[β-sulfonic acid]-6'-dimethylamino)-triazinylaminobenzene, 1-diethylamino-3-(2'-ethylamino-[β-sulfonic acid]-6-cyclohexylamino)-triazinylaminobenzene, 1-diethylamino-3-(2'-ethylamino-[β-sulfonic acid]-6-benzylamino)-triazinylaminobenzene, 1-diethylamino-3-(2'-ethylamino-[β-sulfonic acid]-6'-chloro)-triazinylaminobenzene, 1-diethylamino-3-(2'-phenylamino-[3'-sulfonic acid]-6'-phenylamino)-triazinylaminobenzene, 1-diethylamino-3-(2'-phenylamino-[3''-sulfonic acid]-6'-[2''-methyl]-phenylamino)-triazinylaminobenzene, 1-diethylamino-3-(2'-phenylamino-[3''-sulfonic acid]-6'-[2''-ethyl]-phenylamino)-triazinylaminobenzene, 1-diethylamino-3-(2'-phenylamino-[3''-sulfonic acid]-6'-[2'',4''-dimethyl]-phenylamino)-triazinylaminobenzene, 1-diethylamino-3-(2'-phenylamino-[3''-sulfonic acid]-6'-[2'',5''-dimethyl]-phenylamino)-triazinylaminobenzene and 1-diethylamino-3-(2'-phenylamino-[3''-sulfonic acid]-6'-phenylamino-[3''-sulfonic acid])-triazinylaminobenzene.

Preferably, the compounds of the formula III used are those in which $R_1$ and $R_2$ are each the same alkyl radical and in particular are each the $C_2H_5$ radical, and in which $R_3$ is halogen, monoalkylamino, which has 1 to 10 carbon atoms in the alkyl radical and can be substituted by phenyl, or N,N-dialkylamino, cyclohexylamino, N-alkyl-N-cyclohexyl-amino, arylamino or N-alkyl-N-aryl-amino and $R_4$ is alkoxy having 1 to 8 carbon atoms, cyclohexyloxy, monoalkylamino, which can be substituted by phenyl, or cyclohexylamino, arylamino or N,N-dialkylamino, and in particular those compounds in which $R_3$ is halogen, in particular chlorine, and $R_4$ is alkoxy having 1 to 8 carbon atoms, especially isopropoxy.

Not only the diazotisation of the compound II but also the coupling reaction of the compound II with the compound III and also the condensation reaction of the compound IV with the dichlorotriazine or cyanuric chloride are known and are carried out in accordance with conventional methods.

The novel monoazo compounds of the formula I are used, in particular, as dyes for dyeing and printing textile materials, which can be dyed with anionic dyes, in particular polyamide materials and wool. Dyeing can be carried out by any desired continuous or discontinuous methods (for example exhaustion, padding or printing processes) which are suitable for the particular substrate. Using the monoazo dyes according to the invention, dyeings are obtained which have good general fastness properties, such as, in particular, a good dye build-up, very good wet fastness properties, good fastness to light, good stability to formaldehyde and good covering of streakiness.

The textile materials to be dyed can be in very diverse processing forms, such as knitted fabrics, woven fabrics, yarns and fibers, and also finished articles, such as shirts.

In the examples which follow, parts are by weight, unless indicated othewise, percentages are by weight and temperatures are in degrees centigrade. The examples are intended to illustrate the invention without, however, restricting it in any respect.

EXAMPLE 1

23.9 g of dichloro-isopropoxy-(s)-triazine are allowed to run gradually dropwise into a mixture consisting of 16.4 g of the compound of the formula

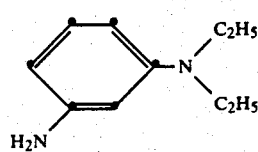

and 50 ml of water, at 8°–10° and a pH value of 7, with good stirring, the pH being adjusted to the desired value by adding 20% sodium carbonate solution. After the reaction has gone to completion, the product of the formula

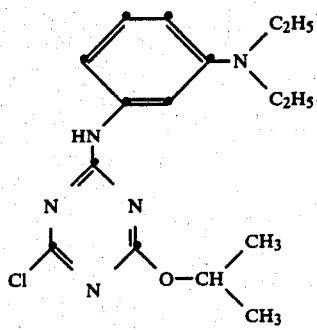

which has formed, separates out as a resinous mass. The supernatant liquor is decanted off and the product is washed with water, after which it is dissolved in ethylene glycol monoethyl ether.

When the above procedure is repeated except that the dichlorotriazine compounds indicated in column I of Table I below are used, the compounds indicated in column II are obtained, and these have similar chemical properties.

TABLE I

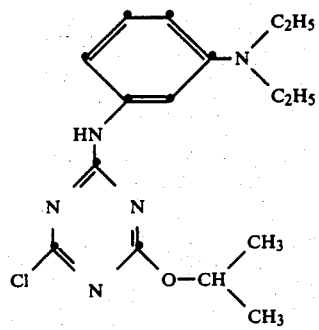

| No. | R |
|---|---|
| 2 | —OCH$_3$ |
| 3 | —OC$_2$H$_5$ |
| 4 | —O—C$_3$H$_7$ (n) |
| 5 | —O—C$_4$H$_9$ (n) |
| 6 | —O—CH(CH$_3$)—C$_2$H$_5$ |
| 7 | —O—CH$_2$—CH(CH$_3$)$_2$ |
| 8 | —O—⟨pyridyl⟩ |
| 9 | —O—CH$_2$—CH(C$_2$H$_5$)—C$_4$H$_9$ |

EXAMPLE 10

2/100 mol of 2,5-dichloroaniline-4-sulfonic acid are dissolved in 60 ml of water to give a neutral solution, 5 ml of 4N sodium nitrite solution are added and the mixture is poured onto 60 g of ice and 6 ml of 36% hydrochloric acid. After stirring for two hours at 0°-2°, the excess nitrite is destroyed with sulfamic acid and the pH value is adjusted to 3 by adding solid sodium carbonate. An ethylene glycol monoethyl ether solution containing 2/100 mol of the compound of the formula

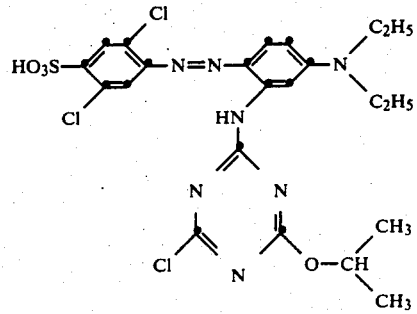

is now allowed to run in at 0°-2°, the pH value being kept at 3.5-4 by adding 4N sodium hydroxide solution. After the coupling reaction has ended, the pH is adjusted to 7 and the dye formed is isolated in the conventional manner by salting out with sodium chloride.

After drying, the sodium salt of the resulting dye of the formula forms a red powder which dissolves in water to give a red solution.

The red dyeings produced with the aid of this dye on polyamide fabric from a weakly acid bath have good fastness properties and in particular have good fastness to light and good wet fastness properties.

When, employing an analogous procedure, the diazo components listed under D in Table II below are used in place of the diazo component indicated above, and the coupling components indicated in the said table are used in place of the above coupling component, dyes are obtained which have similar properties and which dye polyamide in the indicated shade.

TABLE II

Coupling component:

[Structure: phenyl ring with N(C2H5)2 group and HN-C(=N-)(N=) linkage to a triazine-like group bearing Cl and R substituents]

| No. | D | R | Shade on polyamide |
|---|---|---|---|
| 11 | HO₂S—C₂H₄—NHO₂S—[2,5-dichloro-4-amino-phenyl]— | —O—CH(CH₃)₂ | red |
| 12 | " | —O—C₂H₅ | " |
| 13 | " | —O—C₃H₇ (n) | " |
| 14 | " | —O—C₄H₉ (n) | " |
| 15 | " | —O—CH(CH₃)—C₂H₅ | " |
| 16 | " | —O—CH₂—CH(CH₃)₂ | " |
| 17 | " | —O—C₆H₁₁ (cyclohexyl) | " |
| 18 | " | —O—CH₂—CH(C₂H₅)—C₄H₉ | " |
| 19 | HO₃S—O—C₂H₄—NHO₂S—[2,5-dichloro-4-amino-phenyl]— | —O—CH(CH₃)₂ | " |
| 20 | " | —O—C₂H₅ | " |
| 21 | HO₃S—O—C₂H₄—NHO₂S—[2,5-dichloro-4-amino-phenyl]— | —O—C₃H₇ (n) | " |
| 22 | " | —O—C₄H₉ (n) | " |
| 23 | " | —O—CH(CH₃)—C₂H₅ | " |
| 24 | " | —O—CH₂—CH(CH₃)₂ | " |

TABLE II-continued

Coupling component:

a benzene ring with N(C₂H₅)₂ substituent and HN- linked to a triazine ring bearing Cl and R substituents

| No. | D | R | Shade on polyamide |
|---|---|---|---|
| 25 | " | —O—(phenyl, H) | " |
| 26 | " | —O—CH₂—CH(C₂H₅)—C₄H₉ | " |
| 27 | 2,5-dichloro-4-sulfo-aniline (HO₃S, Cl, Cl, NH₂ on benzene) | —O—C₂H₅ | " |
| 28 | " | —O—C₃H₇ (n) | " |
| 29 | " | —O—C₄H₉ (n) | " |
| 30 | " | —O—CH(CH₃)—C₂H₅ | " |
| 31 | 2,5-dichloro-4-sulfo-aniline | —O—CH₂—CH(CH₃)₂ | " |
| 32 | " | —O—(phenyl, H) | " |
| 32a | " | SCH₃ | " |
| 33 | " | —O—CH₂—CH(C₂H₅)—C₄H₉ | " |
| 34 | HO₃S—(phenyl)—NHO₂S—(2,5-dichloro-phenyl)—NH₂ | —O—C₂H₅ | " |
| 34a | " | —O—CH₃ | " |
| 35 | " | —O—CH(CH₃)₂ | " |

TABLE II-continued
Coupling component:
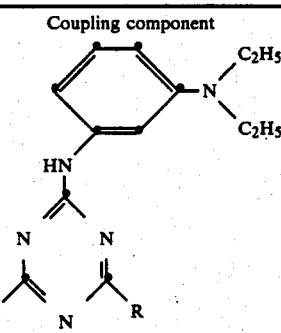
| No. | D | R | Shade on polyamide |
|-----|---|---|---------------------|
| 36 | " | —O—C$_3$H$_7$ (n) | " |
| 37 | " | —O—C$_4$H$_9$ (n) | " |
| 38 | " | —O—CH(CH$_3$)—C$_2$H$_5$ | " |
| 39 | " | —O—CH$_2$—CH(CH$_3$)$_2$ | " |
| 40 | 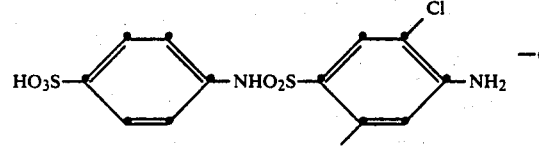 HO$_3$S—⟨⟩—NHO$_2$S—⟨Cl,Cl⟩—NH$_2$ | —O—⟨phenyl⟩ | " |
| 41 | " | —O—CH$_2$—CH(C$_2$H$_5$)—C$_4$H$_9$ | " |
| 42 | 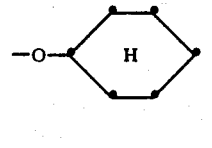 ⟨SO$_3$H⟩—NHO$_2$S—⟨Cl,Cl⟩—NH$_2$ | —OCH$_3$ | " |
| 43 | " | —O—C$_2$H$_5$ | " |
| 44 | " | —O—CH(CH$_3$)$_2$ | " |
| 45 | " | —O—C$_3$H$_7$ (n) | " |
| 46 | " | —O—C$_4$H$_9$ (n) | " |
| 47 | " | —O—CH(CH$_3$)—C$_2$H$_5$ | " |
| 48 | " | O—CH$_2$—CH(CH$_3$)$_2$ | " |
| 49 | 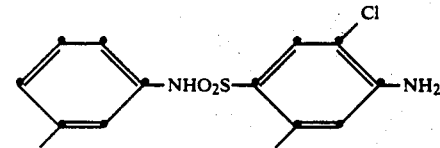 ⟨SO$_3$H⟩—NHO$_2$S—⟨Cl,Cl⟩—NH$_2$ | —O—⟨phenyl⟩ | " |

TABLE II-continued
Coupling component
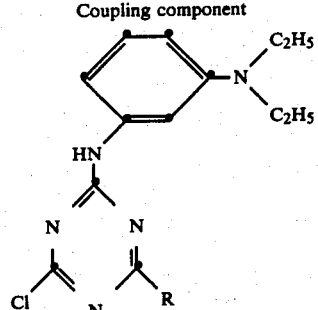
| No. | D | R | Shade on polyamide |
|---|---|---|---|
| 50 | " | —O—CH$_2$—CH(C$_2$H$_5$)—C$_4$H$_9$ | " |
| 51 | 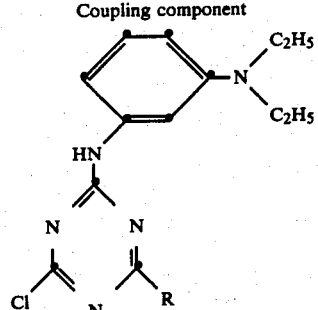 | —OCH$_3$ | " |
| 52 | " | —OC$_2$H$_5$ | " |
| 53 | " | —O—CH(CH$_3$)$_2$ | " |
| 54 | " | —O—C$_3$H$_7$ (n) | " |
| 55 | " | —O—C$_4$H$_9$ (n) | " |
| 56 | " | —O—CH(CH$_3$)—C$_2$H$_5$ | " |
| 57 | " | —O—CH$_2$—CH(CH$_3$)$_2$ | " |
| 58 | 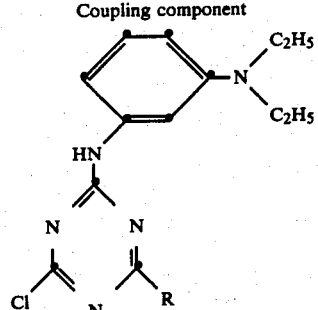 | —O—C$_6$H$_5$ | " |
| 59 | " | —O—CH$_2$—CH(C$_2$H$_5$)—C$_4$H$_9$ | " |
| 60 | 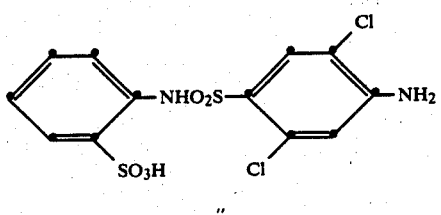 | —OCH$_3$ | " |
| 61 | " | —OC$_2$H$_5$ | " |
| 62 | " | —O—CH(CH$_3$)$_2$ | " |

TABLE II-continued

Coupling component:

[Structure: diethylamino-phenyl-NH-triazine with Cl and R substituents]

| No. | D | R | Shade on polyamide |
|-----|---|---|--------------------|
| 63 | " | —O—C$_3$H$_7$ (n) | " |
| 64 | " | —O—C$_4$H$_9$ (n) | " |
| 65 | " | —O—CH(CH$_3$)—C$_2$H$_5$ | " |
| 66 | " | —O—CH$_2$—CH(CH$_3$)$_2$ | " |
| 67 | " | —O—C$_6$H$_{11}$ (cyclohexyl) | " |
| 68 | HO$_3$S—C$_6$H$_4$—NHO$_2$S—C$_6$H$_3$(Cl)—NH$_2$ | —O—CH$_2$—CH(C$_2$H$_5$)—C$_4$H$_9$ | " |
| 69 | (SO$_3$H)C$_6$H$_3$—NHO$_2$S—C$_6$H$_3$(Cl)—NH$_2$ | —OCH$_3$ | " |
| 70 | " | —OC$_2$H$_5$ | " |
| 71 | " | —O—CH(CH$_3$)$_2$ | " |
| 72 | " | —O—C$_3$H$_7$ (n) | " |
| 73 | " | —O—C$_4$H$_9$ (n) | " |
| 74 | " | O—CH(CH$_3$)—C$_2$H$_5$ | " |
| 75 | " | —O—CH$_2$—CH(CH$_3$)$_2$ | " |
| 76 | " | —O—C$_6$H$_{11}$ (cyclohexyl) | " |

TABLE II-continued

Coupling component:

A 1,4-phenylene ring with N(C₂H₅)₂ group, connected via HN to a triazine ring bearing Cl and R substituents:

$$\text{[1,4-phenylene]}-\text{NH}-\text{C(=N-)}-\text{triazine with Cl and R}$$

with N(C₂H₅)₂ on the phenylene.

| No. | D | R | Shade on polyamide |
|---|---|---|---|
| 77 | 3-sulfo-phenyl–NHO₂S–(2-chloro-4-amino-phenyl) | $-O-CH_2-CH(C_2H_5)-C_4H_9$ | " |
| 78 | 2-sulfo-phenyl–NHO₂S–(2-chloro-4-amino-phenyl) | $-OCH_3$ | " |
| 79 | " | $-OC_2H_5$ | " |
| 80 | " | $-O-CH(CH_3)_2$ | " |
| 81 | " | $-O-C_3H_7\ (n)$ | " |
| 82 | " | $-O-C_4H_9\ (n)$ | " |
| 83 | " | $-O-CH(CH_3)-C_2H_5$ | " |
| 84 | " | $-O-CH_2-CH(CH_3)_2$ | " |
| 85 | " | $-O-C_6H_{11}$ (cyclohexyl) | " |
| 86 | " | $-O-CH_2-CH(C_2H_5)-C_4H_9$ | " |
| 87 | HO₃S–C₆H₄–NH₂ (4-amino-benzenesulfonic acid) | $-OCH_3$ | Orange |
| 88 | " | $-O-C_2H_5$ | " |
| 89 | " | $-O-CH(CH_3)_2$ | " |

TABLE II-continued

Coupling component:

a triazine-based structure with 3-(diethylamino)anilino group, chloro and R substituents

| No. | D | R | Shade on polyamide |
|-----|---|---|---|
| 90 | " | —OC$_3$H$_7$ (n) | " |
| 91 | " | —O—C$_4$H$_9$ (n) | " |
| 92 | " | —O—CH(CH$_3$)C$_2$H$_5$ | " |
| 93 | " | —O—CH$_2$—CH(CH$_3$)$_2$ | " |
| 94 | " | —O—C$_6$H$_{11}$ (cyclohexyl) | " |
| 95 | " | —O—CH$_2$—CH(C$_2$H$_5$)—C$_4$H$_9$ | " |
| 96 | 4-amino-benzenesulfonic acid (NH$_2$ / SO$_3$H on phenyl) | —OCH$_3$ | reddish-tinged yellow |
| 97 | " | —OC$_2$H$_5$ | " |
| 98 | 4-amino-benzenesulfonic acid | —O—CH(CH$_3$)$_2$ | " |
| 99 | " | —OC$_3$H$_7$ (n) | " |
| 100 | " | —OC$_4$H$_9$ (n) | " |
| 101 | " | —O—CH(CH$_3$)—C$_2$H$_5$ | " |
| 102 | " | —O—CH$_2$—CH(CH$_3$)$_2$ | " |
| 103 | " | —O—C$_6$H$_{11}$ (cyclohexyl) | " |
| 104 | " | —O—CH$_2$—CH(C$_2$H$_5$)—C$_4$H$_9$ | " |

TABLE II-continued

Coupling component:

a 1,3,5-triazine coupling system where a 2,4-disubstituted triazine (Cl and R substituents) is linked via –NH– to a 4-(N,N-diethylamino)phenyl group.

| No. | D | R | Shade on polyamide |
|---|---|---|---|
| 105 | 2-amino-6-chlorobenzenesulfonic acid (Cl, NH₂, SO₃H on benzene) | —OCH₃ | " |
| 106 | " | —OC₂H₅ | " |
| 107 | " | —O—CH(CH₃)₂ | " |
| 108 | 2-amino-6-chlorobenzenesulfonic acid | —OC₃H₇ (n) | " |
| 109 | " | —OC₄H₉ (n) | " |
| 110 | " | —O—CH(CH₃)—C₂H₅ | " |
| 111 | " | —O—CH₂—CH(CH₃)₂ | " |
| 112 | " | —O—C₆H₁₁ (cyclohexyl) | " |
| 113 | " | —O—CH₂—CH(C₂H₅)—C₄H₉ | " |
| 114 | 2-amino-4-methylphenyl sulfonyl linked to 2-aminobenzenesulfonic acid (with CH₃, SO₂, NH₂, SO₃H) | —OCH₃ | red |

TABLE II-continued
Coupling component
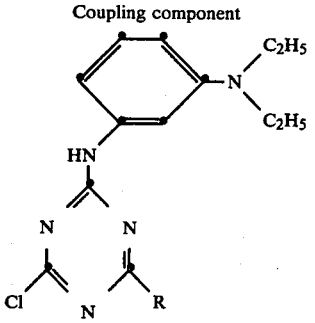
| No. | D | R | Shade on polyamide |
|-----|---|---|---|
| 115 | " | —OC$_2$H$_5$ | " |
| 116 | 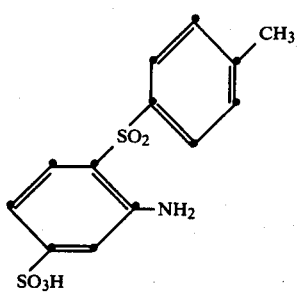 | —O—CH(CH$_3$)$_2$ | " |
| 117 | " | —OC$_3$H$_7$ (n) | " |
| 118 | " | —OC$_4$H$_9$ (n) | " |
| 119 | " | —O—CH(CH$_3$)—C$_2$H$_5$ | " |
| 120 | " | —O—CH$_2$—CH(CH$_3$)$_2$ with CH$_3$ | " |
| 121 | " | —O—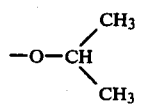—H | " |
| 122 | " | —O—CH$_2$—CH(C$_2$H$_5$)—C$_4$H$_9$ | " |
| 123 | 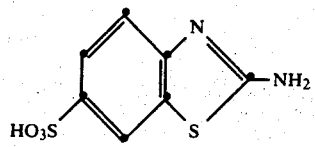 | —OCH$_3$ | " |
| 124 | " | —OC$_2$H$_5$ | " |
| 125 | " | —O—CH(CH$_3$)$_2$ | " |
| 126 | " | —OC$_3$H$_7$ (n) | " |
| 127 | " | —OC$_4$H$_9$ (n) | " |
| 128 | " | —O—CH(CH$_3$)—C$_2$H$_5$ | " |

TABLE II-continued

Coupling component

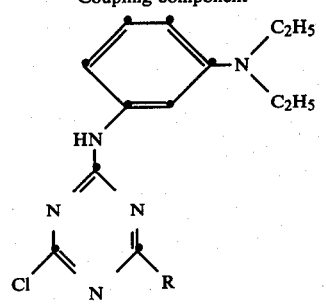

| No. | D | R | Shade on polyamide |
|---|---|---|---|
| 129 | " | —O—CH$_2$—CH(CH$_3$)$_2$ with CH$_3$ | " |
| 130 | " | —O—C$_6$H$_5$ (phenyl, H) | " |
| 131 | " | —O—CH$_2$—CH(C$_2$H$_5$)—C$_4$H$_9$ | " |

EXAMPLE 132

16.4 g of the compound of the formula

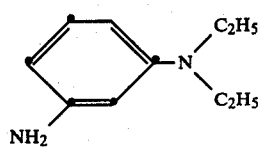

are added dropwise, at a temperature of 0°–2° and a pH value of about 5, to a fine suspension of cyanuric chloride, prepared by pouring a solution of 18.5 g of cyanuric chloride in 100 ml of acetone onto 350 g of ice and 55 ml of water. After the reaction has gone to completion, the pH value is adjusted to 7, the temperature is raised to 15°–20° and the mixture is reacted with 6 g of isopropylamine at pH 8. The pH is adjusted to the desired value by adding 20% sodium carbonate solution. The product of the formula

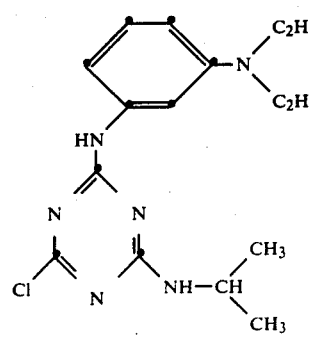

which has formed, is filtered off at pH 7 and for use as a coupling component is dissolved in ethylene glycol monoethyl ether.

When the same procedure is repeated except that equivalent amounts of the amines indicated in column I of Table III below are used in place of isopropylamine, the coupling components indicated in column II are obtained, and these have similar chemical properties.

TABLE III

II

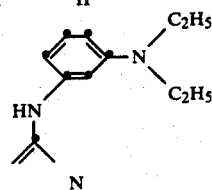

| No. | I Amines | R |
|---|---|---|
| 133 | H$_2$N—C$_3$H$_7$(n) | —NH—C$_3$H$_7$(n) |
| 134 | H$_2$N—C$_4$H$_9$(n) | —NH—C$_4$H$_9$(n) |
| 135 | H$_2$N—CH(CH$_3$)—C$_2$H$_5$ | —NH—CH(CH$_3$)—C$_2$H$_5$ |
| 136 | H$_2$N—CH$_2$—CH(CH$_3$)$_2$ | —NH—CH$_2$—CH(CH$_3$)$_2$ |
| 137 | H$_2$N—C$_6$H$_5$ | —NH—C$_6$H$_5$ |

TABLE III-continued

| No. | I Amines | II |
|-----|----------|-----|
| 138 | H₂N—CH₂—⌬ | —NH—CH₂—⌬ |
| 139 | HN(CH₃)(CH₂—CH₂—CH₃) | —N(CH₃)(CH₂—CH₂—CH₃) |

EXAMPLE 140

A solution of 2/100 mol of the compound of the formula

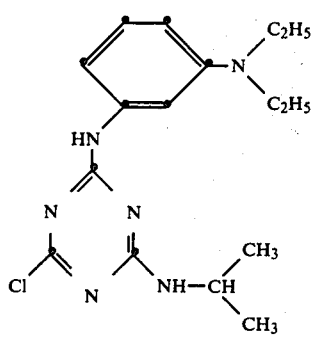

is allowed to run dropwise, at 0°-2°, into a diazo solution of 2/100 mol of 2,5-dichloroaniline-4-sulfonic acid, the pH value of which has been adjusted to 3 with sodium carbonate, and the pH value is kept at 3.5-4 during the addition. After the coupling reaction has gone to completion, the pH is adjusted to 7 and the dye formed is isolated in the conventional manner by salting out with sodium chloride.

After drying, the dye of the formula

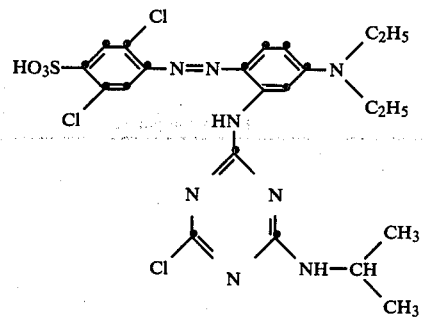

in the form of the sodium salt, forms a red powder which dissolves in water to give a red solution. The red dyeings produced on polyamide using this dye from a weakly acid bath have good fastness to light and good wet fastness properties.

When an analogous procedure is employed using the diazo components indicated in column I of Table IV below and the coupling components indicated in column II, dyes are obtained which have similar properties and which dye polyamide in the colour shades indicated in column III.

TABLE IV

| No. | I Diazo component | II R | III Shade on polyamide |
|-----|-------------------|------|------------------------|
| 141 | HO₃S—⌬(Cl)(Cl)—NH₂ | —NH—C₃H₇(n) | red |
| 142 | " | —NH—C₄H₉(n) | " |

TABLE IV-continued

Structure II:

A benzene ring with N(C₂H₅)₂ substituent and HN— connection to a triazine ring bearing Cl and R substituents.

| No. | I<br>Diazo component | R | III<br>Shade on polyamide |
|---|---|---|---|
| 143 | " | —NH—CH(CH₃)—C₂H₅ | " |
| 144 | " | —NH—CH₂—CH(CH₃)₂ | " |
| 145 | " | —NH—C₆H₅ (phenyl) | " |
| 146 | " | —NH—CH₂—C₆H₅ (benzyl) | " |
| 147 | " | —N(CH₃)(CH₂—CH₂—CH₃) | " |
| 148 | HO₃S—C₂H₄—NHO₂S—(2,5-dichloro-4-amino-phenyl) | —NH—CH(CH₃)₂ | " |
| 149 | " | —NH—C₃H₇(n) | " |
| 150 | " | NH—C₄H₉(n) | " |
| 151 | " | —NH—CH(CH₃)—C₂H₅ | " |
| 152 | " | —NH—CH₂—CH(CH₃)₂ | " |
| 153 | " | —NH—C₆H₅ (phenyl) | " |
| 154 | " | —NH—CH₂—C₆H₅ (benzyl) | " |

TABLE IV-continued

Structure II:

2,4-bis-amino substituted benzene with N(C₂H₅)₂ group, connected via HN to a triazine ring bearing Cl and R substituents:

$$\text{II: } \underset{\text{4-position}}{\text{C}_6\text{H}_3}-N(C_2H_5)_2 \text{ with } 2\text{-NH-}[1,3,5\text{-triazine}](Cl)(R)$$

| No. | I Diazo component | R | III Shade on polyamide |
|---|---|---|---|
| 155 | " | —N(CH₃)(CH₂—CH₂—CH₃) | " |
| 156 | HO₃S—O—C₂H₄—NHO₂S— (2,5-dichloro-4-amino-phenyl) | —NH—CH(CH₃)₂ | " |
| 157 | " | —NH—C₃H₇(n) | " |
| 158 | " | —NH—C₄H₉(n) | " |
| 159 | " | —NH—CH(CH₃)—C₂H₅ | " |
| 160 | " | —NH—CH₂—CH(CH₃)₂ | " |
| 161 | HO₃S—O—C₂H₄—NHO₂S— (2,5-dichloro-4-amino-phenyl, sulfonamide at different position) | —NH—C₆H₅ | " |
| 162 | " | —NH—CH₂—C₆H₅ | " |
| 163 | " | —N(CH₃)(CH₂—CH₂—CH₃) | " |
| 164 | HO₃S—C₆H₄—NHO₂S— (2,5-dichloro-4-amino-phenyl) | —NH—CH(CH₃)₂ | " |
| 165 | " | —NH—C₃H₇(n) | " |
| 166 | " | —NH—C₄H₉(n) | " |
| 167 | " | —NH—CH(CH₃)—C₂H₅ | " |

TABLE IV-continued

Structure II (header, applies to all rows):

$$\text{II: } \underset{\substack{| \\ R}}{\overset{Cl}{C}}=N-\overset{N}{\underset{\|}{C}}-NH-\text{C}_6\text{H}_3(\text{N}(\text{C}_2\text{H}_5)_2)- \text{ with triazine bearing } R$$

(Triazine ring with Cl and R substituents, linked via –NH– to a phenyl ring bearing –N(C$_2$H$_5$)$_2$)

| No. | I Diazo component | R | III Shade on polyamide |
|---|---|---|---|
| 168 | " | –NH–CH$_2$–CH(CH$_3$)$_2$ | " |
| 169 | " | –NH–C$_6$H$_{11}$ (cyclohexyl, H) | " |
| 170 | " | –NH–CH$_2$–C$_6$H$_5$ | " |
| 171 | " | –N(CH$_3$)(CH$_2$–CH$_2$–CH$_3$) | " |
| 172 | 2-amino-3-(4-methylphenylsulfonyl)-benzenesulfonic acid (NH$_2$, SO$_2$–C$_6$H$_4$–CH$_3$, SO$_3$H on benzene) | –NH–CH(CH$_3$)$_2$ | " |
| 173 | " | –NH–C$_3$H$_7$(n) | " |
| 174 | " | –NH–C$_4$H$_9$(n) | " |
| 175 | " | –NH–CH(CH$_3$)–C$_2$H$_5$ | " |
| 176 | " | –NH–CH$_2$–CH(CH$_3$)$_2$ | " |
| 177 | " | –NH–C$_6$H$_{11}$ (cyclohexyl, H) | " |
| 178 | " | –NH–CH$_2$–C$_6$H$_5$ | " |

TABLE IV-continued

| No. | I Diazo component | II [structure shown above] | III Shade on polyamide |
|---|---|---|---|
| 179 | " | $-N\begin{array}{c}CH_3\\CH_2-CH_2-CH_3\end{array}$ | " |

EXAMPLE 180

4.4 g of n-butylamine are added, at 40° and a pH of about 8, to a mixture consisting of 17 g of the compound of the formula

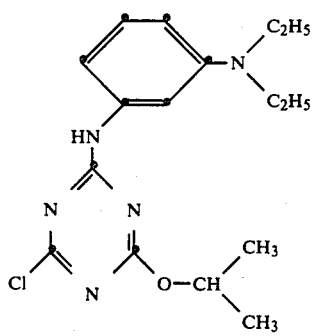

180 ml of dimethylformamide and 70 ml of water. After the reaction had ended, the pH is adjusted to 7, the water contained in the mixture is distilled off in vacuo, the residue is clarified by filtration and a solution of the compound of the formula

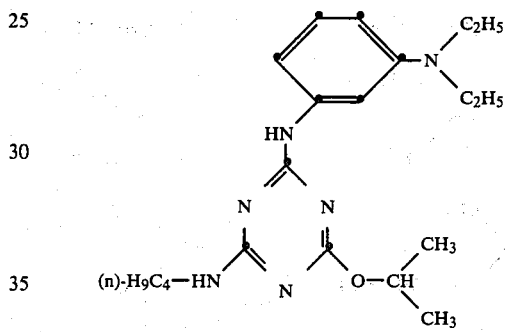

is obtained which can be used for coupling reactions.

When the same procedure is repeated using the amines listed in column I of Table V below in place of n-butylamine, the coupling components indicated in column II are obtained, and these have similar chemical properties.

TABLE V

| No. | I Amines | II Coupling components R |
|---|---|---|
| 181 | $H_2N-CH\begin{array}{c}CH_3\\CH_3\end{array}$ | $-NH-CH\begin{array}{c}CH_3\\CH_3\end{array}$ |
| 182 | $H_2N-CH-C_2H_5$<br>$\phantom{H_2N-}|$<br>$\phantom{H_2N-}CH_3$ | $-NH-CH-C_2H_5$<br>$\phantom{-NH-}|$<br>$\phantom{-NH-}CH_3$ |

TABLE V-continued

II  
Coupling components

| No. | I Amines | R |
|-----|----------|---|
| 183 | H₂N—CH₂—CH(CH₃)₂ | —NH—CH₂—CH(CH₃)₂ |
| 184 | H₂N—C₃H₇ (n) | —NH—C₃H₇ (n) |
| 185 | HN(C₂H₅)₂ | —N(C₂H₅)₂ |
| 186 | HN(CH₃)(CH₂—CH₂—CH₃) | —N(CH₃)(CH₂—CH₂—CH₃) |
| 187 | H₂N—⟨H⟩ | —NH—⟨H⟩ |

EXAMPLE 188

A solution of 2/100 mol of the compound of the formula

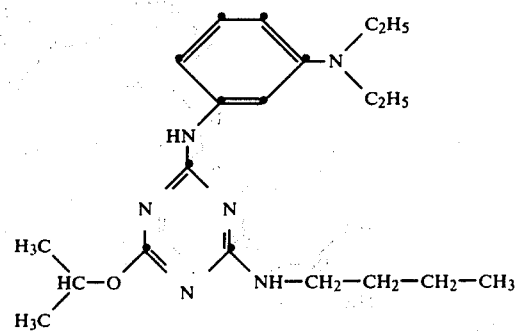

in dimethylformamide is allowed to run dropwise, at 0°–2°, into a diazonium salt solution corresponding to 2/100 mol of 2,5-dichloroaniline-4-sulfonic acid, the pH of which has been adjusted to 3 with sodium carbonate, and the pH value is kept at 3.5–4 during the addition. After the coupling reaction has ended, the pH is adjusted to 7 and the dye which has formed is isolated by salting out with sodium chloride. In the form of the sodium salt, the dye of the formula

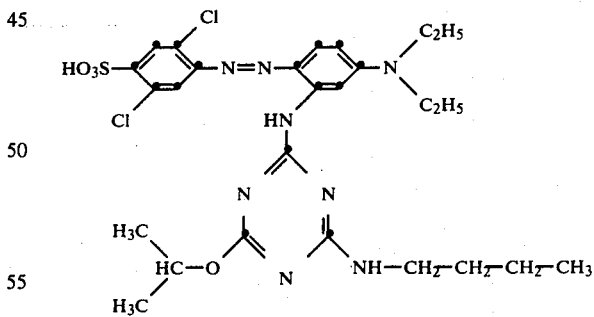

is a red powder which dissolves in water to give a red solution. The red dyeings obtainable on polyamide fabric using this dye from a weakly acid bath have good fastness to light and good wet fastness properties.

When the same procedure is repeated except that the diazo components listed under I in Table VI below are used in place of the 2,5-dichloroaniline-4-sulfonic acid, and the coupling components used are those listed under II, dyes are obtained which have similar properties and which dye polyamide fabric in the colour shades indicated under III.

TABLE VI

II Coupling component:

4-(N,N-diethylamino)phenyl-NH-C(=N-)-N=C(R)-N, with O-CH(CH₃)₂ on one carbon

| No. | I Diazo components | R | III Shade polyamide |
|---|---|---|---|
| 189 | 2,5-dichloro-4-amino benzenesulfonic acid (HO₃S, Cl, Cl, NH₂ on benzene) | $-NH-CH(CH_3)_2$ | red |
| 190 | " | $-NH-C_2H_5$ | " |
| 191 | " | $-NH-C_3H_7(n)$ | " |
| 192 | " | $-NH-CH(CH_3)-C_2H_5$ | " |
| 193 | HO₃S—C₂H₄—NHO₂S-(2,5-dichloro-4-amino-phenyl) | $-NH-C_4H_9(n)$ | " |
| 194 | " | $-NH-CH(CH_3)-C_2H_5$ | " |
| 195 | " | $-NH-C_6H_{11}$ (cyclohexyl, H) | " |
| 196 | HO₃S—O—C₂H₄—NHO₂S-(2,5-dichloro-4-amino-phenyl) | $-NH-C_4H_9(n)$ | " |
| 197 | " | $-NH-CH(CH_3)-C_2H_5$ | " |
| 198 | " | $-NH-C_6H_{11}$ (cyclohexyl, H) | " |
| 199 | HO₃S-C₆H₄-NHO₂S-(2,5-dichloro-4-amino-phenyl) | $-NH-CH(CH_3)_2$ | " |

TABLE VI-continued

| | | II Coupling component | |
|---|---|---|---|
| No. | I Diazo components | R | III Shade polyamide |
| 200 | " | —NH—C$_3$H$_7$(n) | " |
| 201 | " | —NH—C$_4$H$_9$(n) | " |
| 202 | " | —NH—CH(CH$_3$)—C$_2$H$_5$ | " |
| 203 | (structure) | —NH—CH(CH$_3$)$_2$ | " |
| 204 | " | —NH—CH(CH$_3$)—C$_2$H$_5$ | " |
| 205 | (structure) | —NH—CH(CH$_3$)$_2$ | " |
| 206 | " | —NH—CH(CH$_3$)—C$_2$H$_5$ | " |

EXAMPLE 207

6 g of isopropylamine are added to a mixture consisting of 16.7 g of the compound of the formula

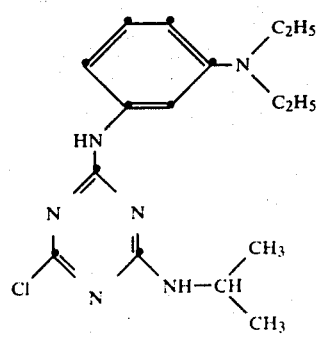

and 80 ml of ethylene glycol monoethyl ether and the whole is heated for 2 hours in an autoclave at a temperature of 105°–110°. The solvent is then removed in vacuo and the residue is treated with water, after which the compound of the formula

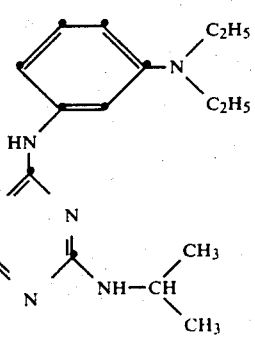

which is thus obtained, is dissolved in dimethylformamide. This solution can be used for coupling reactions.

When the same procedure is repeated except that equivalent amounts of the amines listed under I in Table VII below are used in place of isopropylamine, the coupling components indicated in column II are obtained, and these have similar chemical properties. When higher-boiling amines are used, the reaction can be carried out under normal pressure.

TABLE VII

| | II Coupling component | |
|---|---|---|
| I Amine | | R |
| 208 | $H_2N-C_3H_7(n)$ | $-NH-C_3H_7(n)$ |
| 209 | $H_2N-C_4H_9(n)$ | $-NH-C_4H_9(n)$ |
| 210 | $H_2N-CH-C_2H_5$ <br> $\quad\quad\quad\;\, |$ <br> $\quad\quad\;\;CH_3$ | $-NH-CH-C_2H_5$ <br> $\quad\quad\quad\;\, |$ <br> $\quad\quad\;\;CH_3$ |
| 211 | $H_2N-CH_2-CH\begin{smallmatrix}CH_3\\CH_3\end{smallmatrix}$ | $-NH-CH_2-CH\begin{smallmatrix}CH_3\\CH_3\end{smallmatrix}$ |
| 212 | $H_2N-CH_3$ | $-NH-CH_3$ |
| 213 | $H_2N-C_2H_5$ | $-NH-C_2H_5$ |
| 214 | $HN\begin{smallmatrix}C_2H_5\\C_2H_5\end{smallmatrix}$ | $-N\begin{smallmatrix}C_2H_5\\C_2H_5\end{smallmatrix}$ |
| 215 | $HN\begin{smallmatrix}C_4H_9(n)\\C_4H_9(n)\end{smallmatrix}$ | $-N\begin{smallmatrix}C_4H_9(n)\\C_4H_9(n)\end{smallmatrix}$ |
| 216 | $H_2N-\langle H \rangle$ | $-NH-\langle H \rangle$ |
| 217 | $H_2N-CH_2-\langle\;\rangle$ | $-NH-CH_2-\langle\;\rangle$ |

EXAMPLE 218

A dimethylformamide solution containing 2/100 mol of the compound of the formula

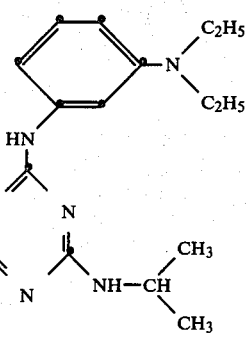

is allowed to run dropwise, at 0°–2°, into a diazonium salt solution which has been prepared from 4.85 g of 2,5-dichloroaniline-4-sulfonic acid and the pH of which has been adjusted to 3 with sodium carbonate, and the pH value of the mixture is kept at 3.5–4 during the addition. After the coupling reaction has gone to completion, the pH is adjusted to 7 and the dye formed is isolated in the conventional manner by salting out with sodium chloride. After drying, the dye of the formula

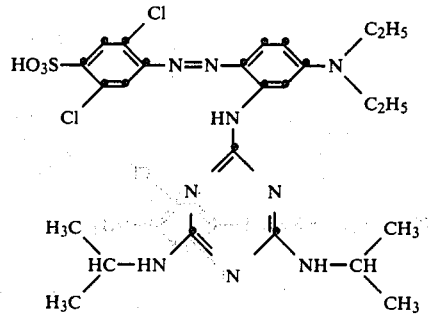

in the form of the sodium salt, is a red powder which dissolves in water to give a red solution. Applied from a weakly acid bath, the dye dyes polyamide fabric red, and the dyeings have good fastness properties.

When the same procedure is repeated except that the diazo components listed under I in Table VIII below are used in place of the dichloroaniline-sulfonic acid, and the coupling components listed in column II are used in place of the indicated coupling component, dyes are obtained which have similar properties and which dye polyamide in the colour shades indicated under III.

TABLE VIII

II Coupling components:

A triazine-based structure with a phenyl ring bearing N(C₂H₅)₂ group, linked via HN to a triazine ring where one N substituent is —NH—CH(CH₃)₂ and the other position is R.

| No. | I Diazo components | R | III Shade on polyamide |
|---|---|---|---|
| 219 | 2,5-dichloro-4-amino benzenesulfonic acid (HO₃S, Cl, Cl, NH₂ on benzene) | —NH—C₃H₇ (n) | red |
| 220 | " | —NH—CH₃ | " |
| 221 | " | —NH—C₂H₅ | " |
| 222 | " | —NH—C₄H₉ (n) | " |
| 223 | " | —NH—CH(CH₃)—C₂H₅ | " |
| 224 | " | —N(C₂H₅)₂ | " |
| 225 | " | —N(C₄H₉(n))₂ | " |
| 226 | HO₃S—C₂H₄—NHO₂S—(2,5-dichloro-4-amino phenyl) | —NH—CH(CH₃)₂ | " |
| 227 | " | —NH—CH(CH₃)—C₂H₅ | " |
| 228 | " | —NH—C₂H₅ | " |
| 229 | HO₃S—O—C₂H₄—NHO₂S—(2,5-dichloro-4-amino phenyl) | —NH—C₂H₅ | " |
| 230 | " | —NH—CH(CH₃)₂ | " |
| 231 | " | —NH—C₃H₇ (n) | " |
| 232 | " | —NH—CH(CH₃)—C₂H₅ | " |

TABLE VIII-continued

| | I | II Coupling components | | III |
|---|---|---|---|---|
| No. | Diazo components | (structure shown above) R | R | Shade on polyamide |
| 233 | HO₃S—⟨⟩—NHO₂S—⟨⟩(Cl,Cl)—NH₂ | | —NH—C₂H₅ | " |
| 234 | " | | —NH—CH(CH₃)₂ | " |
| 235 | 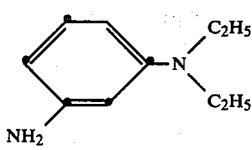 | | —NH—C₂H₅ | " |

EXAMPLE 236

12.5 g of 1-amino-ethane-2-sulfonic acid are added gradually, at a temperature of 0°–2° and a pH value of 7–8, to a suspension obtained by pouring a solution of 18.5 g of cyanuric chloride in 100 ml of acetone onto 350 g of ice and 55 ml of water. After the reaction had ended, 16.4 g of the compound of the formula (structure: aniline with N(C₂H₅)₂ and NH₂)

are added, the pH value is raised to 8 with 20% sodium carbonate solution and the temperature is raised to 18°–20°, whereupon the reaction with the compound of the indicated formula takes place. After the reaction has taken place, the pH is adjusted to 7 with hydrochloric acid and the reaction mixture is evaporated to dryness in vacuo. The residue is treated with 100 ml of toluene and the product is filtered off and washed twice more with toluene. After drying, the product of the formula

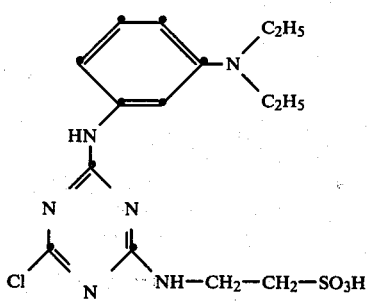

is obtained in the form of the sodium salt, as a colourless powder which contains sodium chloride.

11.3 g of N-methyl-N-cyclohexylamine and 4 g of sodium hydroxide are added to a mixture consisting of 0.1 mol of the above compound and 400 ml of water and the resulting mixture is then stirred at 90°–95° until the reaction has gone to completion. Finally, the pH is adjusted to 7 with hydrochloric acid and the product of the formula

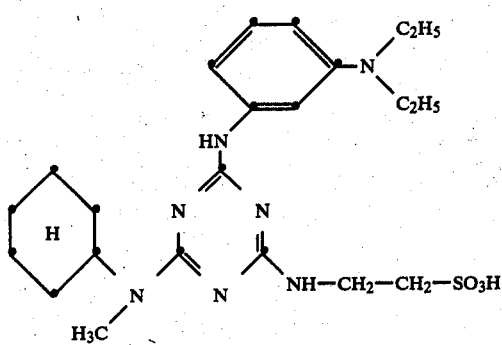

is isolated in the form of its sodium salt by salting out with sodium chloride; after drying, this product is a colourless powder, aqueous solutions of which can be used for coupling reactions.

When the same procedure is repeated except that equivalent amounts of the amines listed under I in Table IX below are used in place of the N-methyl-N-cyclohexylamine, the coupling components listed in column II are obtained, which have similar chemical properties.

TABLE IX

| | II Coupling components | |
|---|---|---|
| No. | I Amines | R |
| 237 | H$_2$N—CH$_3$ | —NH—CH$_3$ |
| 238 | H$_2$N—C$_2$H$_5$ | —NH—C$_2$H$_5$ |
| 239 | HN(CH$_3$)$_2$ | —N(CH$_3$)$_2$ |
| 240 | H$_2$N—C$_3$H$_7$(n) | —NH—C$_3$H$_7$(n) |
| 241 | H$_2$N—CH(CH$_3$)$_2$ | —NH—CH(CH$_3$)$_2$ |
| 242 | H$_2$N—C$_4$H$_9$(n) | —NH—C$_4$H$_9$(n) |
| 243 | H$_2$N—CH(CH$_3$)—C$_2$H$_5$ | —NH—CH(CH$_3$)—C$_2$H$_5$ |
| 244 | HN(C$_4$H$_9$(n))$_2$ | —N(C$_4$H$_9$(n))$_2$ |
| 245 | H$_2$N—⟨cyclohexyl-H⟩ | —NH—⟨cyclohexyl-H⟩ |

TABLE IX-continued

| | II Coupling components | |
|---|---|---|
| No. | I Amines | R |
| 246 | H$_2$N—CH$_2$—⟨Ph⟩ | —NH—CH$_2$—⟨Ph⟩ |
| 247 | H$_2$N—⟨Ph⟩ | —NH—⟨Ph⟩ |
| 248 | HN(CH$_3$)—⟨Ph⟩ | —N(CH$_3$)—⟨Ph⟩ |
| 249 | HN(C$_2$H$_5$)—⟨Ph⟩ | —N(C$_2$H$_5$)—⟨Ph⟩ |
| 250 | H$_2$N—CH$_2$—CH(C$_2$H$_5$)—C$_4$H$_9$ | —NH—CH$_2$—CH(C$_2$H$_5$)—C$_4$H$_9$ |
| 251 | H$_2$N—C$_{10}$H$_{21}$ | —NH—C$_{10}$H$_{21}$ |

EXAMPLE 252

4.10 g of 4-amino-3-chloro-phenyl methyl sulfone are diazotised with nitrosylsulfuric acid in 98% sulfuric acid and the resulting diazo solution is then added dropwise at a temperature of 0°–2° to a mixture consisting of 2/100 mol of the compound of the formula

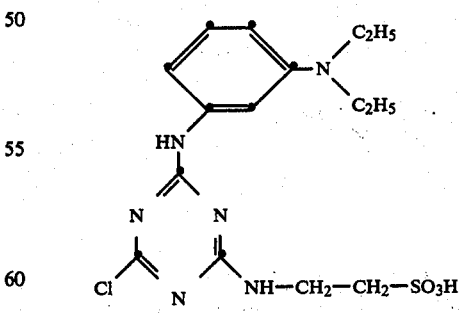

150 ml of water and 250 g of ice, the pH value of the mixture being kept at 3–4 by the dropwise addition of concentrated sodium hydroxide solution. Finally, the pH is adjusted to 7, the mixture is heated briefly to 60°, in order to improve the filterability, and allowed to cool to room temperature, and the dye which has precipitated is filtered off and washed with 2% sodium chloride solution. After drying, the dye of the formula

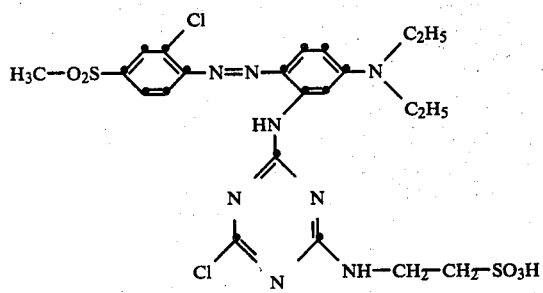

in the form of its sodium salt, is a red powder which dissolves in water to give a red solution.

The red dyeings obtained on polyamide using this dye from a weakly acid bath have good wet fastness properties and good fastness to light.

When the same procedure is repeated except that the diazo components listed under I in Table X below are used in place of the diazo component used above, and the coupling components listed in column II are used in place of the abovementioned coupling component, dyes with similar properties are obtained, the colour shades of which are indicated in column III.

TABLE X

| No. | I Diazo components | II Coupling components R | | III shade on polyamide |
|---|---|---|---|---|
| 253 | 4-amino-3-chloro-(ethylsulfonyl)benzene | —Cl | | red |
| 254 | 4-amino-3-bromo-(methylsulfonyl)benzene | " | | " |
| 255 | 4-amino-(methylsulfonyl)benzene | " | | orange |
| 256 | 4-amino-2,4,5-trichloroaniline | " | | red |
| 257 | 4-amino-3-chloro-(N,N-diethylsulfamoyl)benzene | " | | " |
| 258 | 4-amino-3-bromo-(N,N-diethylaminosulfonyloxy)benzene | " | | " |

TABLE X-continued

| | II Coupling components | |
|---|---|---|
| | (structure with diethylamino-phenyl-HN-triazine with R,R and NH-CH$_2$-CH$_2$-SO$_3$H substituents) | III shade on polyamide |
| No. | I Diazo components | R | |

| No. | Diazo components | R group | Shade on polyamide |
|---|---|---|---|
| 259 | phenyl-NHO$_2$S-(3-Cl, 4-NH$_2$)phenyl | " | " |
| 260 | phenyl-N(CH$_3$)O$_2$S-(3-Cl, 4-NH$_2$)phenyl | " | " |
| 261 | (n)H$_9$C$_4$-NHO$_2$S-(3-Cl, 4-NH$_2$)phenyl | " | " |
| 262 | H$_5$C$_2$-CH(CH$_3$)-NHO$_2$S-(3-Cl, 4-NH$_2$)phenyl | " | " |
| 263 | 4-methylphenyl-SO$_2$-(2-NH$_2$, 4-SO$_3$H)phenyl | -NH-C$_4$H$_9$ (n) | " |
| 264 | " | -NH-CH(CH$_3$)-C$_2$H$_5$ | " |
| 265 | " | -NH-phenyl | " |
| 266 | " | -N(CH$_3$)-phenyl | " |

TABLE X-continued

| No. | I Diazo components | II Coupling components (see structure below) R | III shade on polyamide |
|---|---|---|---|
| 267 | " | —NH—CH₂—C₆H₅ | " |
| 268 | " | H₂N—C₆H₄— | " |
| 269 | " | —N(CH₃)—C₆H₅ | " |
| 270 | " | —N(C₂H₅)—C₆H₅ | " |
| 271 | " | —NH—CH₂—CH(C₂H₅)—C₄H₉ | " |
| 272 | 2,5-dichloro-4-sulfo-aniline (HO₃S, Cl, Cl, NH₂ on benzene) | —N(CH₃)—C₆H₁₁ (cyclohexyl) | " |
| 273 | " | —N(CH₃)—C₆H₅ | " |
| 274 | " | —N(C₂H₅)—C₆H₅ | " |

Coupling component II structure:

Benzene ring with N(C₂H₅)₂ and HN—C(=N)— linked to a triazine bearing R and NH—CH₂—CH₂—SO₃H substituents.

TABLE X-continued

| | II Coupling components | III shade on poly-amide |
|---|---|---|
| No. Diazo components | (structure with $C_2H_5$, $NH-CH_2-CH_2-SO_3H$, R, N) | |
| 275 " | $-NH-CH_2-\underset{\underset{C_2H_5}{\mid}}{CH}-C_4H_9$ | " |
| 276 " | $-NH-C_{10}H_{21}$ | " |
| 277 (structure: $HO_3S$–phenyl–$NHO_2S$–phenyl(Cl)–$NH_2$) | $-Cl$ | " |
| 278 " | $-NH-\underset{\underset{CH_3}{\mid}}{\overset{\overset{CH_3}{\mid}}{CH}}$ | " |
| 279 " | $-NH-\underset{\underset{CH_3}{\mid}}{CH}-C_2H_5$ | " |
| 280 " | $-NH-$(phenyl, H) | " |
| 281 " | $-N(CH_3)-$(phenyl, H) | " |

EXAMPLE 282

A neutral solution of 17.3 g of metanilic acid in 70 ml of water is added to a suspension obtained by pouring a solution of 18.5 g of cyanuric chloride in 100 ml of acetone onto 350 g of ice and 55 ml of water, the temperature being kept at −2° to 0° and the pH value being kept at 3–3.5 using 20% sodium carbonate solution. After the reaction has gone to completion, 16.4 g of the compound of the formula

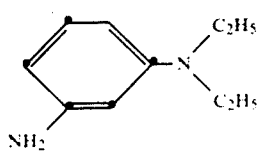

are added, the temperature is raised to 18°–20° and the pH value is raised to 7–8. After no further primary aromatic amine can be detected by means of p-dimethylamino-benzaldehyde, the pH is adjusted to 7 and the product which has formed is isolated by salting out with 10% by volume of sodium chloride and then filtering. After drying, the product of the formula

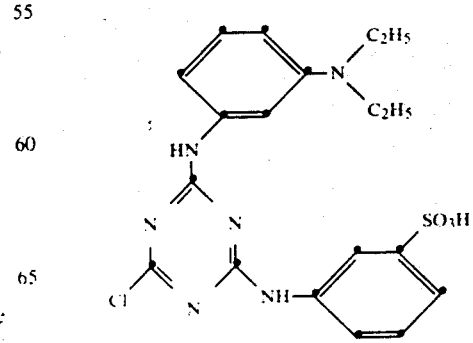

in the form of the sodium salt, is a colourless, water-soluble powder which contains sodium chloride. The aqueous solution couples with diazo solutions.

When the same procedure is repeated except that equivalent amounts of 2-naphthylamine-6-sulfonic acid are used in place of the metanilic acid, the product of the formula

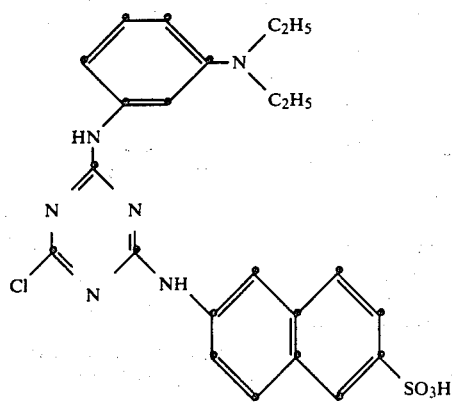

is obtained, which has similar properties.

18.6 g of aniline are added to a solution of 0.1 mol of the first of the two above condensation products in 400 ml of water, the temperature is raised to 85°-90° and the pH value to 11 and the mixture is stirred until the reaction has gone to completion, after which the pH is adjusted to 8.5 and the excess aniline is distilled off with steam. The pH is adjusted to 7, 10% by volume of sodium chloride are added and the product of the formula

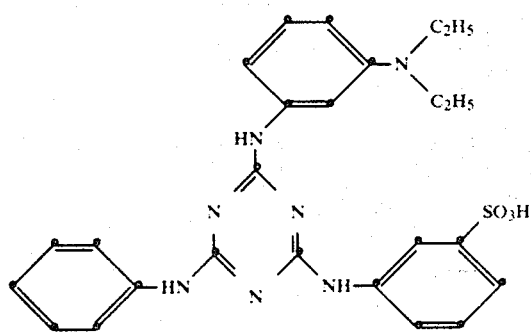

is isolated by filtration. After drying, the sodium salt of the product is obtained in the form of a colourless powder, which dissolves in water. The solution couples on the addition of diazo compounds.

When the same procedure is repeated, except that equivalent amounts of the amines listed under I in Table XI below are used in place of aniline, the coupling components listed in cloumn II are obtained, which have similar chemical properties.

TABLE XI

| | II Coupling components | |
|---|---|---|
| No. | I Amines | R |
| 283 | H₂N—⌬—CH₃ | —HN—⌬—CH₃ |
| 284 | H₂N—⌬—C₂H₅ | —NH—⌬—C₂H₅ |
| 285 | H₂N—⌬(CH₃)—CH₃ | —NH—⌬(CH₃)—CH₃ |
| 286 | H₂N—⌬(CH₃)—CH₃ (CH₃, CH₃) | —NH—⌬(CH₃)—CH₃ (CH₃, CH₃) |
| 287 | H₂N—⌬—OCH₃ | —NH—⌬—OCH₃ |

EXAMPLE 288

16.4 g of metanilic acid are added to a neutral mixture consisting of 0.1 mol of the compound of the formula

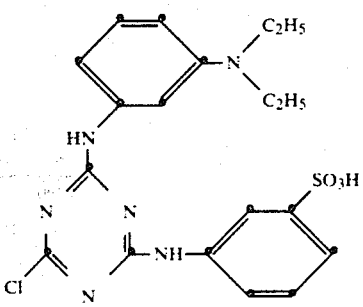

and 400 ml of water, and the pH value is then adjusted to 11.5 and the mixture is stirred at a temperature of 80°-85° until the reaction has gone to completion. The mixture is allowed to cool to 40° and 10% by volume of sodium chloride are added, after which the product which has precipitated is filtered off and washed with 200 ml of 10% sodium chloride solution until the filtrate gives a neutral reaction. After drying, the product is treated with 100 ml of toluene, filtered off and washed with toluene. After drying again, the product of the formula

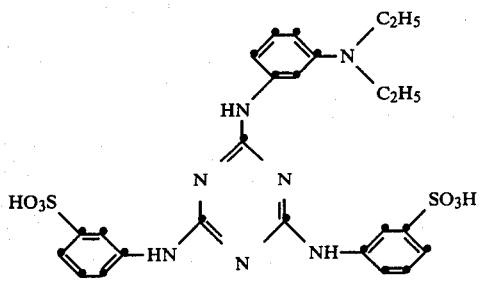

is obtained in the form of the sodium salt, as a colourless, water-soluble powder. The aqueous solutions couple on the addition of diazo compounds.

EXAMPLE 289

10 g of cyclohexylamine are added to a neutral mixture consisting of 0.1 mol of the compound

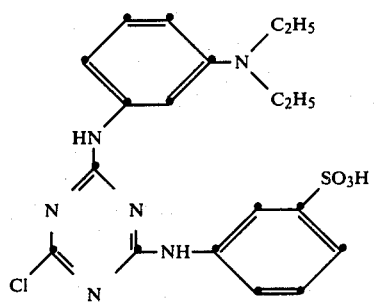

and 400 ml of water, and the mixture is then stirred at pH 11.5–12 and 85°–90° until the reaction has gone to completion. 10% by volume of sodium chloride are then added and the product which has precipitated is isolated by filtration and washed with 10% sodium chloride solution. After drying, the product of the formula

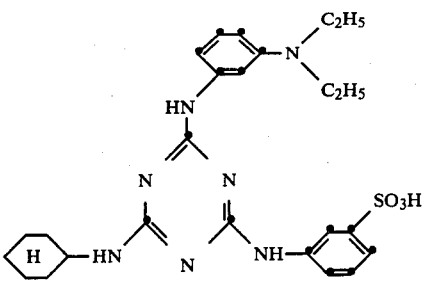

is obtained, in the form of the sodium salt, as a colourless powder which can be dissolved in water. The solutions couple on the addition of diazo compounds.

When the same procedure is repeated except that equivalent amounts of the amines listed under I in Table XII below are used in place of cyclohexylamine, the coupling components listed in column II are obtained, which have similar chemical properties.

TABLE XII

| | II Coupling components |
|---|---|

| No. | I Amines | R |
|---|---|---|
| 290 | HN-C6H4(CH3)H (N-methyl) | -N(CH3)-C6H4-H |
| 291 | HN-C6H4(C3H7(n))H | -N(C3H7(n))-C6H4-H |

TABLE XII-continued

II Coupling components

(structure shown: aniline with N(C₂H₅)₂, NH-triazine bearing R and NH-phenyl-SO₃H)

| No. | I Amines | R |
|---|---|---|
| 292 | HN(C₄H₉(n))-cyclohexyl-H | -N(C₄H₉(n))-cyclohexyl-H |
| 293 | H₂N—CH₂—CH(C₂H₅)—C₄H₉ | —NH—CH₂—CH(C₂H₅)—C₄H₉ |
| 294 | H₂N—CH₂—C₆H₅ | —NH—CH₂—C₆H₅ |
| 295 | H₂N—CH₂—CH₂—C₆H₅ | —NH—CH₂—CH₂—C₆H₅ |
| 296 | H₂N—C₁₀H₂₁ | —NH—C₁₀H₂₁ |

EXAMPLE 297

4.10 g of 4-amino-3-chloro-phenyl methyl sulfone are diazotised with nitrosylsulfuric acid in 98% sulfuric acid and the resulting diazonium salt solution is added dropwise at a temperature of 0°-2° and a pH value of 3-3.5 to a mixture consisting of 2/100 mol of the compound of the formula

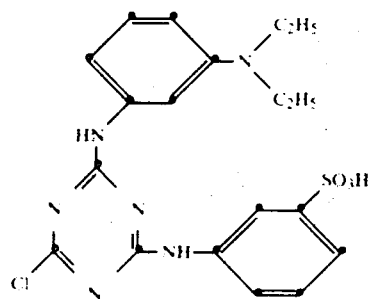

200 ml of water and 300 g of ice, the pH being adjusted to the desired value by the addition of concentrated sodium hydroxide solution. After the coupling reaction has gone to completion, the pH is adjusted to 7 and the mixture is heated to 50°, whereupon the dye separates out as an oil. This oil is separated from the aqueous phase by decanting and the dye is dried in vacuo at 70°.

The resulting dye of the formula

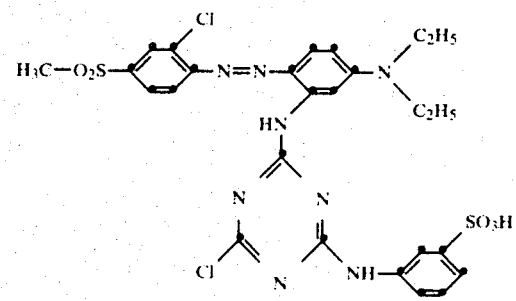

in the form of the sodium salt, forms a red powder which dissolves in water to give a red solution.

Using this dye from a weakly acid bath, red dyeings can be obtained on polyamide fabric; these dyeings are distinguished by good wet fastness properties and good fastness to light.

When an analogous procedure is employed using the diazo components indicated in column I of Table XIII below in place of 4-amino-3-chloro-phenyl methyl sulfone and using the coupling components indicated in column II, dyes were obtained which have similar properties; the colour shades of these dyes on polyamide are indicated in the last column.

TABLE XIII

II Coupling components

[Structure: 4-aminophenyl-N,N-diethylamine connected via HN-C(=N-)-N=C(R)-N=C(-NH-phenyl-SO₃H) triazine system]

| No. | I Diazo components | R | III Shade on polyamide |
|---|---|---|---|
| 298 | H₃C—O₂S—[phenyl(Br)]—NH₂ | —Cl | red |
| 299 | H₂N—O₂S—[phenyl(Cl)]—NH₂ | " | " |
| 300 | H₂N—O₂S—[phenyl(Br)]—NH₂ | " | " |
| 301 | (H₅C₂)₂N—O₂S—[phenyl(Br)]—NH₂ | " | " |
| 302 | [phenyl-H]—NHO₂S—[phenyl(Br)]—NH₂ | " | " |
| 303 | (n)H₉C₄—NHO₂S—[phenyl(Cl)]—NH₂ | " | " |
| 304 | (n)H₉C₄—NHO₂S—[phenyl(Br)]—NH₂ | " | " |
| 305 | [phenyl with Cl, Cl, Cl]—NH₂ | " | " |
| 306 | [phenyl with Cl, Cl]—NH₂ | " | orange |
| 307 | [phenyl with Cl, SO₂CH₃]—NH₂ | " | " |

TABLE XIII-continued

II
Coupling components

[Structure: benzene ring with N(C₂H₅)₂ group, connected via HN to a triazine ring with R substituent, connected via NH to benzene ring with SO₃H]

| No. | I Diazo components | R | III Shade on polyamide |
|---|---|---|---|
| 308 | [benzene with Cl, NH₂, SO₂C₂H₅] | " | " |
| 309 | [benzene with Cl, NH₂, SO₂NH₂] | " | " |
| 310 | [benzene with Cl, NH₂, SO₂—NH—C₄H₉ (n)] | " | " |
| 311 | [benzene with Cl, NH₂, SO₂—N(C₂H₅)₂] | " | " |
| 312 | [benzene with Cl, NH₂, CF₃] | " | " |
| 313 | [benzene with CH₃, SO₂, NH₂, SO₃H] | " | " |
| 314 | " | —NH—[phenyl] | red |
| 315 | " | —NH—[phenyl-CH₃] | " |

TABLE XIII-continued

II Coupling components

(structure: benzene ring with N(C₂H₅)₂ substituent, connected via HN–C(=N)–N=C(R)–N=C(NH–)– linkage to a benzene ring bearing SO₃H)

| No. | I Diazo components | R | III Shade on polyamide |
|---|---|---|---|
| 316 | " | —NH—C₆H₄(C₂H₅) | " |
| 317 | " | —NH—C₆H₃(CH₃)(CH₃) | " |
| 318 | " | —NH—C₆H₃(CH₃)(CH₃) | " |
| 319 | " | —NH—C₆H₄(OCH₃) | " |
| 320 | 2,5-dichloro-4-amino-benzenesulfonic acid (HO₃S–C₆H₂(Cl)(Cl)–NH₂) | —NH—C₆H₅ | " |
| 321 | " | —NH—C₆H₄(CH₃) | " |
| 322 | " | —NH—C₆H₄(C₂H₅) | " |
| 323 | " | —NH—C₆H₃(CH₃)(CH₃) | " |

EXAMPLE 324

3.90 g of 2,4,5-trichloro-aniline are diazotised in 93% sulfuric acid with nitrosylsulfuric acid and the diazo solution is then added dropwise, at a temperature of 0°–2°, to a mixture consisting of 2/100 mol of the compound of the formula

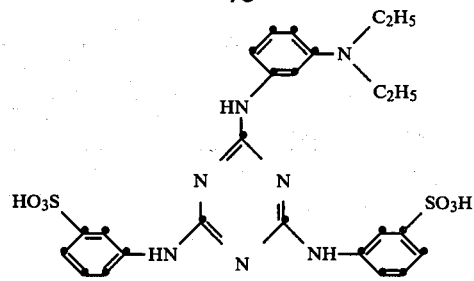

in the form of the sodium salt, 200 ml of water and 300 g of ice, the pH value being kept at about 3. After the coupling reaction has ended, the pH value is adjusted to 7 and the dye which has formed is isolated by salting out with sodium chloride and then filtering off in the conventional manner.

After drying, the dye of the formula

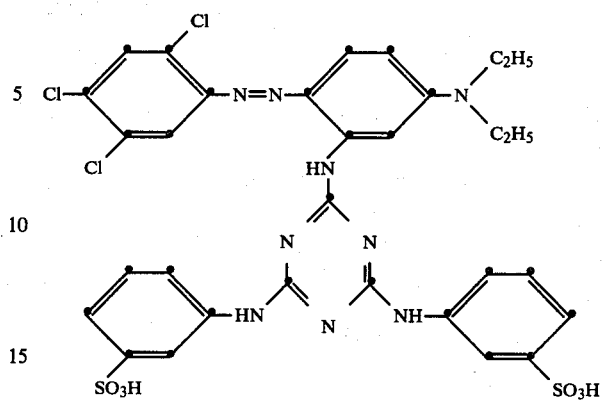

in the form of the sodium salt, is a red powder which dissolves in water to give a red solution.

The red dyeings produced on polyamide fabric using this dye from a weakly acid bath have good fastness to light and good wet fastness properties.

When the same procedure is repeated except that equivalent amounts of the diazo compounds listed in Table XIV are used in place of trichloroaniline, dyes are obtained which have similar properties.

TABLE XIV

| No. | Diazo component | Coupling component | Shade on polyamide |
|---|---|---|---|
| 325 | 2,5-dichloroaniline | (structure shown) | red |
| 326 | 2,3-dichloroaniline | " | " |
| 327 | 2-chloro-5-methylsulfonylaniline | " | " |
| 328 | 2-chloro-5-ethylsulfonylaniline | " | " |

TABLE XIV-continued

| No. | Diazo component | Coupling component | Shade on polyamide |
|-----|----------------|-------------------|---------------------|
| 329 | 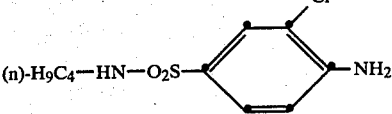 (n)-H₉C₄—HN—O₂S— (Cl, NH₂ on ring) | " | " |
| 330 | 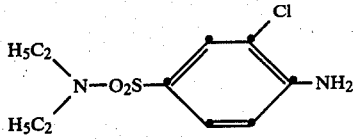 (H₅C₂)₂N—O₂S— (Cl, NH₂ on ring) | " | " |
| 331 | 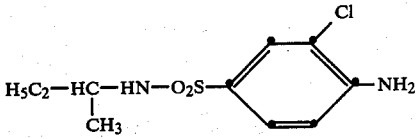 H₅C₂—HC(CH₃)—HN—O₂S— (Cl, NH₂ on ring) | " | " |
| 332 | 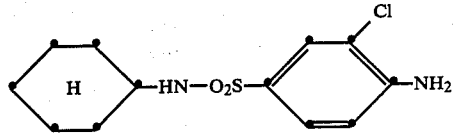 cyclohexyl-HN—O₂S— (Cl, NH₂ on ring) | " | " |
| 333 | 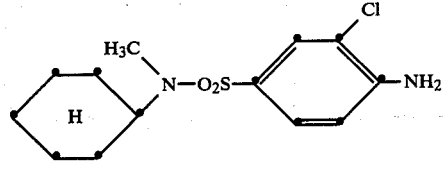 cyclohexyl-N(CH₃)—O₂S— (Cl, NH₂ on ring) | " | " |
| 334 | 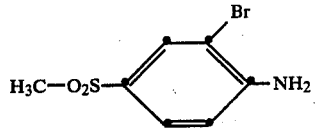 H₃C—O₂S— (Br, NH₂ on ring) | " | " |
| 335 | 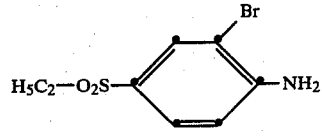 H₅C₂—O₂S— (Br, NH₂ on ring) | " | " |
| 336 | 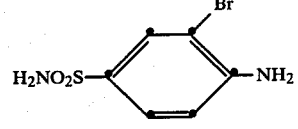 H₂NO₂S— (Br, NH₂ on ring) | " | " |
| 337 | 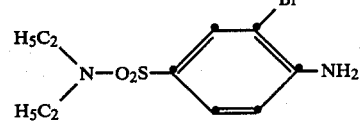 (H₅C₂)₂N—O₂S— (Br, NH₂ on ring) | " | " |
| 338 | 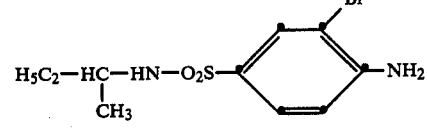 H₅C₂—HC(CH₃)—HN—O₂S— (Br, NH₂ on ring) | " | " |

TABLE XIV-continued

| No. | Diazo component | Coupling component | Shade on polyamide |
|---|---|---|---|
| 339 | 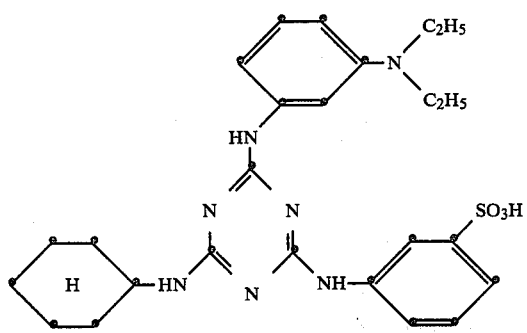 | " | " |

EXAMPLE 340

5.85 g of 2,5-dichloroaniline-4-sulfonic acid are diazotised indirectly and the diazo solution is then added dropwise, at 0°–2°, to a mixture consisting of 2/100 mol of the compound of the formula

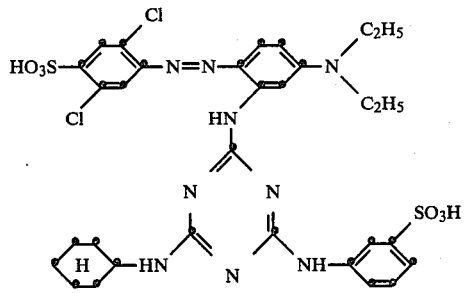

in the form of the sodium salt and 100 ml of water, the pH value being kept at 3–4 by means of sodium hydroxide solution. After the coupling reaction has ended, the pH is adjusted to 7 and the dye which has formed is isolated in the conventional manner by salting out with sodium chloride. After drying, the dye of the formula in the form of the sodium salt, is a red powder which dissolves in water to give a red solution.

The red dyeings produced on polyamide fabric using this dye from a weakly acid bath have good fastness to light and good wet fastness properties.

When the same procedure is repeated except that the diazo components listed in column I of Table XV below are used in place of the dichloroaniline-sulfonic acid, and the coupling components according to column II are used in place of the coupling component employed above, dyes are obtained which have similar properties.

TABLE XV

| No. | I Diazo components | II Coupling components / R | III Shade on polyamide |
|---|---|---|---|
| 341 | HO₃S—(2,5-dichloro)—NH₂ | —N(CH₃)(cyclohexyl-H) | red |

TABLE XV-continued

II
Coupling components

[Structure: A phenyl ring bearing -N(C₂H₅)₂ connected via -HN- to a triazine ring (with substituent R) that is further linked via -NH- to a benzene ring bearing -SO₃H]

| No. | I Diazo components | R | III Shade on polyamide |
|---|---|---|---|
| 342 | " | -N(C₃H₇(n))(C₆H₁₁, H) [N-n-propyl-cyclohexylamino] | " |
| 343 | " | -N(C₄H₉(n))(C₆H₁₁, H) [N-n-butyl-cyclohexylamino] | " |
| 344 | " | -NH-CH₂-CH(C₂H₅)-C₄H₉ | " |
| 345 | " | -NH-CH₂-C₆H₅ | " |
| 346 | " | -NH-CH₂-CH₂-C₆H₅ | " |
| 347 | " | -NH-C₁₀H₂₁ | " |
| 348 | HO₃S-C₆H₄-NHO₂S-C₆H₂(Cl)₂-NH₂ (2,5-dichloro) | -NH-C₆H₁₁ | " |
| 349 | " | -N(CH₃)(C₆H₁₁) | " |

TABLE XV-continued
II
Coupling components
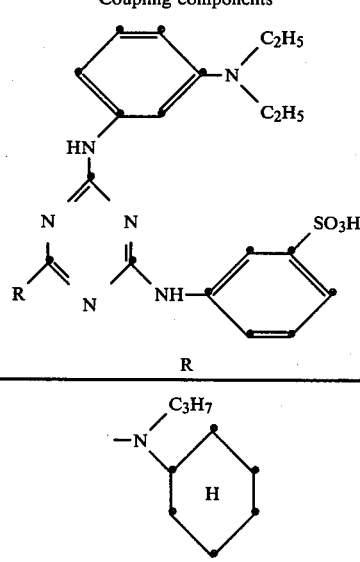
| No. | I Diazo components | R | III Shade on polyamide |
|---|---|---|---|
| 350 | " | −N(C₃H₇)(C₆H₄-H) | " |
| 351 | " | −N(C₄H₉)(C₆H₄-H) | " |
| 352 | " | −NH−CH₂−CH(C₂H₅)−C₄H₉ | " |
| 353 | " | −NH−CH₂−C₆H₅ | " |
| 354 | " | −NH−CH₂−CH₂−C₆H₅ | " |
| 355 | " | −NH−C₁₀H₂₁ | " |
| 356 | 2,5-dichloro-4-amino-phenyl-SO₂−NH−C₆H₄−SO₃H | −NH−(C₆H₄-H) | " |
| 357 | " | −N(CH₃)(C₆H₄-H) | " |

TABLE XV-continued

II Coupling components

[Structure: substituted triazine with diethylamino-phenyl-NH, R group, and sulfophenyl-NH substituents]

| No. | I Diazo components | R | III Shade on polyamide |
|---|---|---|---|
| 358 | " | —N(C₃H₇ (n))(C₆H₁₁) [N-n-propyl cyclohexyl] | " |
| 359 | " | —N(C₄H₉ (n))(C₆H₁₁) [N-n-butyl cyclohexyl] | " |
| 360 | " | —NH—CH₂—CH(C₂H₅)—C₄H₉ | " |
| 361 | " | —NH₂—CH₂—C₆H₅ | " |
| 362 | " | —NH—CH₂—CH₂—C₆H₅ | " |
| 363 | " | —NH—C₁₀H₂₁ | " |
| 364 | [structure: 2-sulfo-phenyl-NHSO₂-2,5-dichloro-4-amino-phenyl] | —NH—C₆H₁₁ | " |
| 365 | " | —N(CH₃)(C₆H₁₁) | " |

TABLE XV-continued

II Coupling components:

Structure: a benzene ring with N(C2H5)2 substituent and HN- linked to a triazine ring (with R group and N=), and NH linked to a benzene ring with SO3H.

| No. | I Diazo components | R | III Shade on polyamide |
|---|---|---|---|
| 366 | " | $-N(C_3H_7 \text{ (n)})-C_6H_{11}$ (N-propyl cyclohexylamine) | " |
| 367 | " | $-N(C_4H_9 \text{ (n)})-C_6H_{11}$ (N-butyl cyclohexylamine) | " |
| 368 | " | $-NH-CH_2-CH(C_2H_5)-C_4H_9$ | " |
| 369 | " | $-NH-CH_2-C_6H_5$ | " |
| 370 | " | $-NH-CH_2-CH_2-C_6H_5$ | " |
| 371 | " | $-NH-C_{10}H_{21}$ | " |
| 372 | $HO_3S-CH_2-CH_2-NHO_2S-$ (2,5-dichloro-4-amino phenyl) | $-NH-C_6H_{11}$ | " |
| 373 | " | $-N(CH_3)-C_6H_{11}$ | " |

TABLE XV-continued

II Coupling components

A structure showing a benzene ring with N(C2H5)2 group, connected via HN to a triazine ring (with R substituent), which connects through NH to a benzene ring bearing SO3H.

| No. | I Diazo components | R | III Shade on polyamide |
|---|---|---|---|
| 374 | " | —N(C3H7 (n))(C6H11, H) | " |
| 375 | " | —N(C4H9 (n))(C6H11, H) | " |
| 376 | " | —NH—CH2—CH(C2H5)—C4H9 | " |
| 377 | " | —NH—CH2—C6H5 | " |
| 378 | " | —NH—CH2—CH2—C6H5 | " |
| 379 | " | —NH—C10H21 | " |
| 380 | HO3S—O—C2H4—NHO2S—[2,5-dichloro-4-amino-phenyl] | —NH—C6H10(H) | " |
| 381 | " | —N(CH3)(C6H10, H) | " |

TABLE XV-continued
| | II Coupling components |
|---|---|
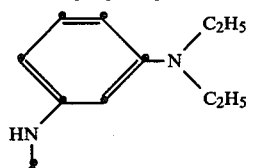
| No. | I Diazo components | R | III Shade on polyamide |
|---|---|---|---|
| 382 | " | —N(C₃H₇ (n))(phenyl, H) | " |
| 383 | " | —N(C₄H₉ (n))(phenyl, H) | " |
| 384 | " | —NH—CH₂—CH(C₂H₅)—C₄H₉ | " |
| 385 | " | —NH—CH₂—phenyl | " |
| 386 | " | —NH—CH₂—CH₂—phenyl | " |
| 387 | " | —NH—C₁₀H₂₁ | " |
| 388 | 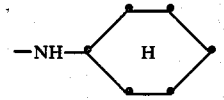 (4-methylphenyl-SO₂-, 2-NH₂, 4-SO₃H benzene) | —NH—phenyl(H) | " |
| 389 | " | —N(CH₃)(phenyl, H) | " |

TABLE XV-continued

II
Coupling components

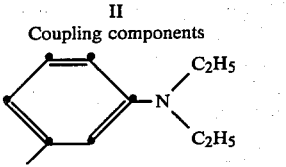

| No. | I<br>Diazo components | R | III<br>Shade on polyamide |
|---|---|---|---|
| 390 | " | 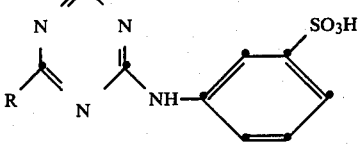 | " |
| 391 | " | 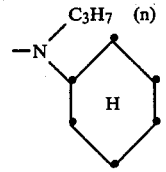 | " |
| 392 | " | —NH—CH$_2$—CH—C$_4$H$_9$<br>　　　　　　｜<br>　　　　　　C$_2$H$_5$ | " |
| 393 | " | 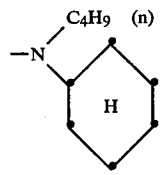 | " |
| 394 | " | 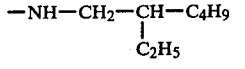 | " |
| 395 | " | —NH—C$_{10}$H$_{21}$ | " |

EXAMPLE 396

4.10 g of 4-amino-3-chloro-phenyl methyl sulfone are diazotised in 98% sulfuric acid using nitrosylsulfuric acid and the resulting diazo solution is then added dropwise, at 0°–2°, to a mixture consisting of 2/100 mol of the compound of the formula

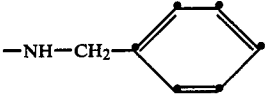

in the form of the sodium salt, 200 ml of water and 300 g of ice, the temperature being kept at 0°–2° and the pH value being kept at 3–4 by means of sodium hydroxide solution. After the coupling reaction has ended, the pH is adjusted to 7 and the dye is isolated in the conventional manner, by salting out with sodium chloride. After drying, the dye forms a red powder, which dissolves in water to give a red solution.

The dye has the formula

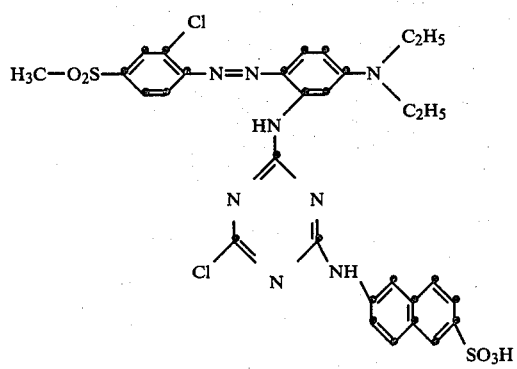

and when used to dye polyamide fabric from a weakly acid bath gives red dyeings which have good fastness to light and good wet fastness properties.

When an analogous procedure is employed, except that equivalent amounts of the diazo components listed in Table XVI are used in place of 4-amino-3-chloro-phenyl methyl sulfone, dyes are obtained which have similar properties.

TABLE XVI

| No. | Diazo component | Coupling component | Colour shade on polyamide |
|---|---|---|---|
| 397 | $H_5C_2-O_2S-\text{(3-Cl,4-NH}_2\text{-phenyl)}$ | (same naphthalene coupling component as above, with $N(C_2H_5)_2$) | red |
| 398 | $(n)-H_9C_4-NHO_2S-\text{(3-Cl,4-NH}_2\text{-phenyl)}$ | " | " |
| 399 | $H_5C_2-HC(CH_3)-NHO_2S-\text{(3-Cl,4-NH}_2\text{-phenyl)}$ | " | " |
| 400 | $(H_5C_2)_2N-O_2S-\text{(3-Cl,4-NH}_2\text{-phenyl)}$ | " | " |
| 401 | phenyl-NHO_2S-\text{(3-Cl,4-NH}_2\text{-phenyl)} | " | " |

TABLE XVI-continued
| No. | Diazo component | Coupling component | Colour shade on polyamide |
|---|---|---|---|
| 402 | 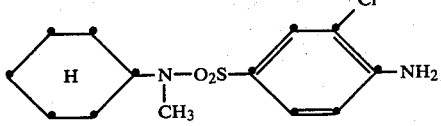 | " | " |
| 403 | 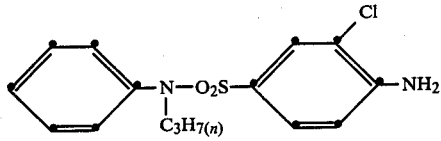 | " | " |
| 404 | 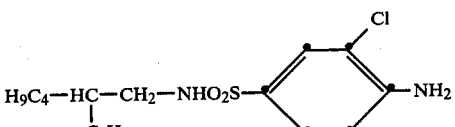 | " | " |
| 405 | 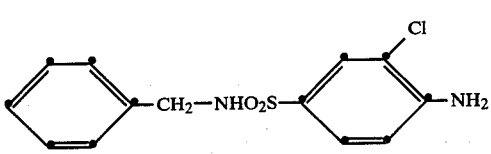 | " | " |
| 406 | 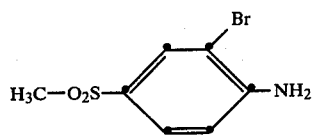 | " | " |
| 407 | 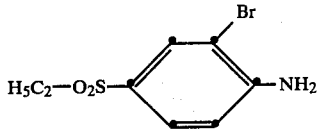 | " | " |
| 408 | 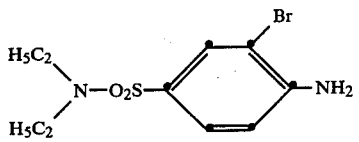 | " | " |
| 409 | 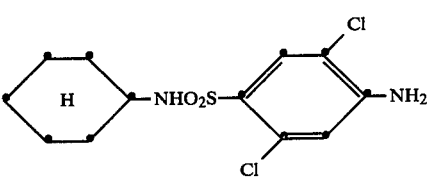 | " | " |
| 410 | 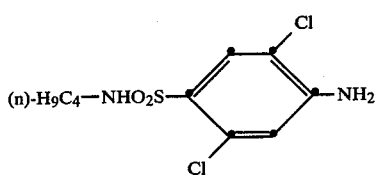 | " | " |
| 411 | 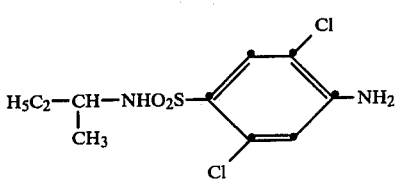 | " | " |

TABLE XVI-continued

| No. | Diazo component | Coupling component | Colour shade on polyamide |
|---|---|---|---|
| 412 | ![structure] H9C4—CH(C2H5)—CH2—NHO2S—(2,5-Cl2)C6H2—NH2 | " | " |
| 413 | C6H5—CH2—NHO2S—(2,5-Cl2)C6H2—NH2 | " | " |

EXAMPLE 414

A dyebath is prepared from 4,000 parts of water, 4 parts of ammonium acetate, 2 parts of the dye according to Example 10 and acetic acid in an amount such that the pH value of the bath is 6. 100 parts of a synthetic polyamide knitted fabric are introduced into the resulting dyebath, the bath is heated to the boil in the course of half an hour and dyeing is carried out for 45 minutes at 100° C. A red dyeing with good wet fastness properties is obtained.

EXAMPLE 415

100 parts of wool knitting yarn are introduced, at 50°, into a dyebath which contains 2 parts of the dye of Example 10, 4 parts of ammonium sulfate and 2 parts of a levelling assistant per 4,000 parts of water. The liquor is heated to the boil in the course of 45 minutes and is kept at the boil for a further 45 minutes. The dyed material is then taken out, rinsed thoroughly with cold water and dried. A red wool dyeing with good fastness properties is obtained.

What is claimed is:
1. An amine of the formula

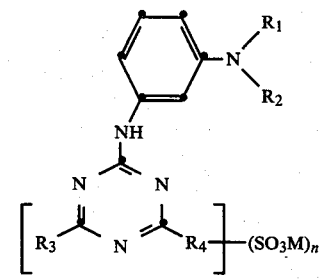

in which $R_1$ and $R_2$ independently of one another are $C_{1-4}$-alkyl, $R_3$ and $R_4$ independently of one another are one of the following radicals; $C_{1-10}$-alkoxy which is unsubstituted or substituted by alkoxy; N-$C_{1-10}$-alkylamino which is unsubstituted or substituted by phenyl; phenylamino which is unsubstituted or substituted by halogen, $C_{1-4}$-alkyl or $C_{1-4}$-alkoxy; naphthylamino which is unsubstituted or substituted by halogen, $C_{1-4}$-alkyl or $C_{1-4}$-alkoxy; halogen; N-phenyl-N-alkylamino; dialkylamino; alkylmercapto; cyclohexyloxy; N-alkyl-N-cyclohexylamino and cyclohexylamino, M is hydrogen or one equivalent of a cation and n is 1 or 2.

* * * * *